US012743853B2

(12) United States Patent
Galardo et al.

(10) Patent No.: US 12,743,853 B2
(45) Date of Patent: Sep. 22, 2026

(54) COMPUTERIZED SYSTEMS AND METHODS FOR AN INDUSTRIAL METAVERSE

(71) Applicant: AVEVA SOFTWARE, LLC, Lake Forest, CA (US)

(72) Inventors: Maurizio Galardo, Milan (IT); Simon Bennett, Cambridge (GB); Alessandro Giusti, Milan (IT)

(73) Assignee: Aveva Software, LLC, Lake Forest, CA (US)

( * ) Notice: Subject to any disclaimer, the term of this patent is extended or adjusted under 35 U.S.C. 154(b) by 51 days.

(21) Appl. No.: 18/511,748

(22) Filed: Nov. 16, 2023

(65) Prior Publication Data

US 2024/0161411 A1 May 16, 2024

Related U.S. Application Data

(60) Provisional application No. 63/425,840, filed on Nov. 16, 2022.

(51) Int. Cl.
*G06T 19/00* (2011.01)
*G06T 17/00* (2006.01)

(52) U.S. Cl.
CPC .............. *G06T 19/00* (2013.01); *G06T 17/00* (2013.01); *G06T 2219/024* (2013.01)

(58) Field of Classification Search
None
See application file for complete search history.

(56) References Cited

U.S. PATENT DOCUMENTS

| | | | | |
|---|---|---|---|---|
| 2010/0091015 | A1* | 4/2010 | Heidel | G06Q 30/06 709/219 |
| 2015/0139552 | A1 | 5/2015 | Xiao et al. | |
| 2022/0283647 | A1* | 9/2022 | Qian | G06T 19/006 |

FOREIGN PATENT DOCUMENTS

| | | | |
|---|---|---|---|
| JP | 2009181578 | A | 8/2009 |
| JP | 5403447 | B2 | 1/2014 |
| KR | 102326507 | B1 | 11/2021 |
| KR | 1020220114549 | A | 8/2022 |

* cited by examiner

*Primary Examiner* — Parul H Gupta
(74) *Attorney, Agent, or Firm* — Dergosits & Noah LLP; Todd A. Noah

(57) ABSTRACT

Disclosed are systems and methods that provide a novel framework for an industrial metaverse that provides an immersive, computerized experience for users to, but not limited to, collaborate on the design of a space, control of machinery, management of employees, and the like. The disclosed framework can execute known or to be known augmented reality (AR), virtual reality (VR), mixed reality (MR) and extended (XR) modules to analyze and render displayable, interactive interface objects within a display of a device. Effectively, the immersive environment created via the disclosed framework creates and enables a spatial, virtual workspace, whereby real-world activities can be virtualized so as to enable seamless, efficient and secure working environments for users. The framework provides a 3D virtual space that provides an interactive platform for users to connect, engage with each other, engage with products/assets and/or digitize physical tasks.

15 Claims, 27 Drawing Sheets

800

1100

1200

1300

COMPUTERIZED SYSTEMS AND METHODS FOR AN INDUSTRIAL METAVERSE

CROSS-REFERENCE TO RELATED APPLICATION

This application claims the benefit of and priority to U.S. Provisional Application No. 63/425,840, filed Nov. 16, 2022, which is hereby incorporated herein by reference in its entirety for all purposes.

FIELD OF THE DISCLOSURE

The present disclosure is generally related to an industrial metaverse, and more particularly, to an interactive, immersive extended reality environment for the control, design, configuration and management of industrial assets, spaces, and products.

BACKGROUND

The term metaverse is widely used to describe a fully immersive three dimensional (3D) virtual space. In a metaverse, users can explore these virtual spaces from a first-person perspective, similar to how they might navigate the real world. This immersive quality is achieved through technologies like virtual reality ("VR"), mixed reality ("MR") and augmented reality ("AR"). Currently, companies and industries are exploring the metaverse for various purposes, including virtual conferences, product design, and even virtual storefronts. Creating a functional metaverse requires a combination of technologies such as 3D modeling, real-time rendering, haptic feedback, and advanced networking. These technologies are continually evolving to improve the immersive and interactive aspects of the metaverse.

In order to create a typical metaverse, the user must build the 3D environment in a development environment and then deploy the 3D environment into a runtime environment where the finalized application runs, providing the end-user experience. The development environment supports the creation process, and the runtime environment executes the final product. When federated models are imported into the 3D environment, the models can be manipulated in the 3D environment, but the changes do not directly extend to the source of the federated model. If changes are made at the source, one must access the source and import the new model to the 3D environment. Likewise, if changes to the 3D environment itself is needed, such as links to outside systems, new code must be written in the development environment and then redeployed as a new runtime environment. Therefore, there is a need in the art to be able to make changes to federated models within a 3D environment and/or changes to the 3D environment without the need to redeploy code from the source.

SUMMARY OF THE DISCLOSURE

According to some embodiments, a metaverse, and the virtual environment it provides, exists where humans are represented by an avatar (and/or other types of digital representations) and may interact with other avatars, both socially and economically, and with software agents in a cyber space. The environment in a metaverse may be built upon a metaphor of the real world, and in some cases, without the physical limitations of the real world. In a metaverse application, users are enabled to, but not limited to, interact with other users, groups, locations, different metaverses, and the like.

According to some embodiments, the disclosed systems and methods provide a novel framework that provides an industrial metaverse. As discussed herein, some embodiments of the disclosed extended reality (XR) framework can integrate known or to be known components of a computerized virtual environment, which can enable the control of locations, assets, people, applications, and the like, or some combination thereof.

By way of a non-limiting example, according to some embodiments, the disclosed framework provides an immersive, computerized experience for users to, but not limited to, collaborate on the design of a space (e.g., a factory or plant), control of machinery (or any other type of real-world asset), control of operations at the plant by the machinery and/or applications executing thereon, management of workers/employees at a location(s), and the like. For example, the disclosed systems and methods can enable management of a company to configure an industrial space where real-world assets are created, managed and exported to customers as interactive 3D models of data (e.g., identified and/or generated 3D data for the assets, for example).

As such, according to some embodiments, the disclosed framework can enable remote operation and/or management of real-world and digital assets, as discussed herein. For example, machinery and/or the software executing thereon can be controlled via a remotely located user that is interacting with a 3D representation of the machinery via the disclosed industrial metaverse.

Accordingly, in some embodiments, the disclosed framework can execute any type of known or to be known augmented reality (AR), virtual reality (VR), mixed reality (MR) and/or XR modules (or applications, programs, engines, templates, environments, services, and the like, as discussed herein) to analyze and render displayable and interactive interface objects (IOs) within a display of a device (e.g., a display of a laptop, or a headset display, for example). Accordingly, in some embodiments, a rendering of the displayed content can be performed via a cloud service (e.g., on the cloud) and streamed to a device for display via Connect, as further described herein. Effectively, the immersive environment created via the disclosed framework creates and enables a spatial, virtual workspace, whereby real-world activities can be virtualized so as to enable seamless, eco-friendly efficient and secure working environments for users. As such, in some embodiments, the disclosed framework provides a 3D virtual space that provides an interactive platform for users to connect, engage with each other, engage with products/assets and/or digitize physical tasks.

By way of a non-limiting example, users can execute and render 3D models (e.g., computer-aided design (CAD) models, for example) in a collaborative manner that is enabled via the industrial metaverse provided by the disclosed framework, as discussed herein according to some embodiments. In another non-limiting example, CAD designed plants can be operated via controls provided via the industrial metaverse.

In some embodiments, the system is configured to enable a user to enter a virtual computer aided drafting ("CAD") environment. In some embodiments, a virtual CAD environment includes a virtual representation (1D, 2D, 3D) of a computer aided drafting system display. In some embodiments, the virtual CAD environment includes a component and/or structure yet to exist in the physical world.

In some embodiments, the configuration, positioning and/or overall design of the control system for a manufacturing plant can be designed via a collaborative CAD design instance with a collection of users. Once implemented, the designed plant's metaverse can enable specific users access to controls associated with the control system so as to enable them to run the plant via the metaverse. Advantageously, according to some embodiments described herein, changes made within the virtual environment can be propagated to one or more clients without the need to redeploy the virtual environment. In some embodiments, this is because the development environment is hosted on a (cloud-based) server as opposed to the client computer executing the code to initiate the 3D environment. In some embodiments, multiple client computers can access the same 3D environment deployed at runtime. Additionally, multiple modules can be connected to the development environment (e.g., XR studio as a non-limiting example) directly through system architecture, and/or indirectly through the connection platform. This enables changes withing the development environment to be propagated to multiple client devices without the need for redeployment.

For purposes of this disclosure, reference will generally be made to files that are created and displayed for interaction, consumption, modification and uploading by users, applications and devices having access to the network hosting/providing the disclosed industrial metaverse, and include both data and metadata related to electronic information contained in the electronic (or digital) files. One of ordinary skill in the art would understand that such files may take any form, whether known or to be known, such as, but not limited to, electronic documents, images, text, audio, video, multi-media, graphics, electronic messages, exchange files, CAD files (e.g., STEP/IFC (Standard for Exchange of Product Model Data/Industrial Foundation Classes) files, steel detail neutral files (SDNF) files, and the like), tag lists, and the like, or some combination thereof. One of ordinary skill in the art would also understand that such files can include, but are not limited to, including any type of known or to be known electronic content, including, but not limited to, images, text, graphics, multi-media, material files, drawings, geometrical exports, exchange data, SaaS (software-as-a-service) data, PaaS (platform-as-a-service) data, IaaS (infrastructure-as-a-service) data, file-transfer-protocol (FTP) data, and the like, or some combination thereof.

Thus, as discussed in more detail below with reference to the Figures, the XR framework enabled via the disclosed systems and methods provides a shared, industrial virtual space where people, locations and assets can be digitally represented, and can be fully interacted with by other people, locations and assets so as to enable an augmented, virtual and/or mixed reality experience representative of a physical space(s). In some embodiments, the digital representations of people, locations and/or assets can be in association with both on-premises ("on-prem" or local devices/storage) data and/or data hosted on a network (e.g., a cloud platform, service or platform). In some embodiments, the disclosed systems and methods embodied and executed through the disclosed framework can be configured to replicate data between locations, which can include local and/or networked locations, such as on-premises sites and the Cloud.

By way of a non-limiting example, as evident from the disclosure herein, a user can interact with a jobsite and the assets operating therein, which can involve, but is not limited to, checking operation of the machinery, analyzing faults and/or errors, checking performance, and the like. Non-limiting examples of such interactions are discussed below in relation to at least FIGS. 9A-14, inter alia. In some embodiments, such interactions can be realized via displayed interactive displays within a metaverse display, which can be realized so as to effectuate an interaction between the user and the real-time data collected for the machinery. Indeed, in some embodiments, users can collaborate by viewing machinery, jobsites and/or real-time data within a single and/or same multiverse display, so as to enable interactive, collaborative and real-time access and interaction with assets via a provided multiverse display. As discussed below, the real-time data can correspond to, but is not limited to, engineering specifics of the asset, operations of the asset, errors/faults of the asset and/or predicted/projected operational values for the asset (e.g., probabilistic data for the asset based on real-time and/or operational values of the asset's operating environment), and the like.

Moreover, in some embodiments, a user can additionally interact with other users that are physically interacting with the jobsite. For example, a user operating within the metaverse for a specific jobsite can have a display screen provided therein that can visualize what another user is viewing when at that site. This can enable, for example, users to interact and collaborate respective to a jobsite and/or machinery/asset across the metaverse and real-world.

For purpose of this disclosure, locations (or spaces) may be referred to as "endpoints", such that an endpoint can refer to devices, applications, locations, assets or some combination thereof, for example, that shares data with another endpoint. For example, an endpoint can be a manufacturing plant (and/or a central server associated with such plant, for example). As will be discussed in detail herein, the data from endpoints can be shared and synchronized from endpoint to endpoint.

Advantages to the architecture described herein include the ability to transmit the 3D development environment (e.g., XR studio) directly to a plurality of client devices. This allows for multiple client devices to modify virtual components and/or the environment itself during an active session, which has been a limitation in the prior art.

In conventional 3D systems, a typical workflow involves one or more users going into a virtual environment to view one or more federated models. A federated model, in the context of computer-aided design (CAD), 3D modeling, and collaborative design processes, refers to a methodology where multiple separate models or datasets are linked or connected to form a cohesive, integrated whole. The term "federated" in this context emphasizes the idea of a federation, where individual entities maintain autonomy but collaborate to achieve a common goal.

In order to make changes to a source federated models in the prior art, one must export each model to another application, then reload all models to new environment where they can be manipulated in 3D space. That is, the changes made to a federated model only exist in the 3D environment until exported to a source location where the original model is overwritten and/or updated. When changing the 3D environment itself, this may involve the need to remove an app from an app repository, then redownload the app to a device to get the latest environment. At the vary least a reboot of the environment is required so that a newly imported model is refreshed in the 3D environment.

In contrast, in some embodiments, the system described herein allows for allows teams to collaborate more effectively by providing a connection platform for sharing and managing engineering and design data from the source according to some embodiments. In some embodiments, a user is able to access documents, drawings, 3D models, and other project-related information outside the 3D environment, and make changes to those projects at the source while simultaneously displaying the changes in the 3D environment. In some embodiments, the connection platform, (e.g., AVEVA Connect; shown in the drawings as "Connect") serves as a hub for pushing the development environment (e.g., XR Studio) to one or more clients. Because the development environment itself is accessible from one or more client computers (unlike prior art systems), any of one or more users within a virtual environment can change a federated model and/or environment at the source as they are all linked by the connection platform. For example, in FIG. 4, although the system architecture normally pushes data to metaverse virtual machines (VMs) from XR Studio, the client computers can also directly connect to XR Studio via Connect and make changes which are then propagated to the client computers at runtime. In some embodiments, Connect also allows the client computers to simultaneously access external data sources and/or storage, make changes, where the changes are automatically propagated into the runtime environment because the changes are made at the source. This saves significant time and computer resources by not needing to redeploy models and/or the environment itself.

Non-limiting connected modules that are able to be modified at the source are shown in FIGS. 4-6, and include, without limitation, metaverse templates, asset template modules, storage databases, customer uploads, external data sources, metaverse virtual machines, and/or client computers according to some embodiments. FIGS. 4-6 illustrate how if various modules are stored in a cloud server, they can be directly accessed by Connect, and/or can be accessed indirectly via XR Studio: they are not to be viewed as separate embodiments and it is understood that the arrangements of modules can be borrowed from each figure and/or connected together in various ways not expressly shown so long as the development environment can receive data from and/or send data to one or more modules via the connection platform. While names such as "Connect" and "XR Studio" are used in the non-limiting detailed examples to reference the figures, it is understood that these names, or any other name used herein, may be replaced with a more generic term such as "connection platform" or "development environment" when describing the metes and bounds of the system.

In some embodiments, users can log in to the connection platform to access their licensed software, updates, and related resources. In some embodiments, the connection platform may connect to other modules which include tools for managing and versioning engineering data. This is beneficial for large-scale projects where multiple teams or individuals are contributing to the design and construction process. In some embodiments, the connection platform may offer project management features, helping users keep track of project milestones, tasks, and timelines. In some embodiments, the connection platform is hosted in the cloud, providing the advantages of scalability, accessibility from anywhere with an internet connection, and the ability to collaborate in real-time.

In some embodiments, the system includes an industrial automation platform including several components. In some embodiments, the platform includes a foundational layer providing essential services like data storage, security, and connectivity. In some embodiments, a visualization module facilitates the creation of dynamic graphical displays and dashboards for real-time process visualization in a 3D environment, while a historization module enables the collection, storage, and analysis of historical process data. In some embodiments, the system includes an event management module that monitors and manages alarms and events in (near) real-time, ensuring a timely response to critical events. In some embodiments, the platform's functionality encompasses seamless integration of disparate systems, unified process visualization, historical data analysis, and effective alarm management for industrial processes while in a 3D environment.

In some embodiments, the system includes one or more HMIs that allow for the creation of interactive graphical interfaces for real-time process monitoring, while, in some embodiments, the system described herein provides a common foundation for Human-Machine Interface (HMI), Supervisory Control and Data Acquisition (SCADA), and Manufacturing Execution Systems (MES) applications in a 3D environment. In some embodiments, the Historian component is configured for storing, retrieving, and analyzing historical process data. In some embodiments, the functionality enabled by the system spans real-time visualization and control of industrial processes, support for manufacturing execution systems, and facilitation of historical data analysis for performance optimization while in a 3D environment.

In some embodiments, the system includes an engineering module designed for efficient project management and execution, and includes components such as engineering information management and design and visualization tools. In some embodiments, the engineering module ensures centralized data management for engineering information, while design and visualization tools comprise software tools for creating and reviewing engineering designs in a 3D space. In some embodiments, the system's functionality enables comprehensive data management throughout an asset lifecycle, support for engineering design activities, and facilitation of collaborative efforts among engineering teams.

In some embodiments, the system includes an information management module configured for maintaining accurate digital asset information, including functions like data warehousing and change management. In some embodiments, data warehousing provides centralized storage for digital asset information, while a change management module tracks and manages changes to the 3D environment and/or federated models at the source in a controlled manner. In some embodiments, the information management module functionality revolves around the management of digital asset information, ensuring its accuracy, and facilitating controlled change management processes.

In some embodiments, the system includes an asset management module that includes a comprehensive system with tools such as asset performance management and maintenance management. In some embodiments, asset performance management monitors and optimizes asset performance, while maintenance management plans and manages asset maintenance activities. In some embodiments, the system's functionality includes maximizing asset efficiency and reliability through performance optimization and optimizing maintenance schedules and resources in a 3D environment.

In some embodiments, the system includes an operations module configured for real-time operational data visualization and collaborative decision support, includes components like real-time data visualization and collaboration tools. In some embodiments, real-time data visualization provides real-time monitoring of operational data, while collaboration tools support collaborative decision-making processes. In some embodiments, the operations module encompasses real-time monitoring of operational data and facilitation of collaborative decision-making for improved operational outcomes.

In some embodiments, the system includes an analytics module. In some embodiments, the analytics module includes a cloud-based solution for industrial analytics that comprises cloud-based analytics and visualization and reporting tools. In some embodiments, the analytics module allows for advanced analytics and insights, while visualization and reporting tools provide capabilities for data visualization and reporting. As described herein, the system's functionality includes cloud-based analytics, remote monitoring of industrial processes, and support for the optimization of operational performance. When accessed via the connection platform, these individual modules can be referred to as endpoints.

In some embodiments, when data is synchronized between two endpoints, a new synchronization instance may be created. Such instance may be automatically created by a cloud server, or can be created by a system administrator, for example. The synchronization instance defines a synchronization event between two endpoints, for example, one being on-premises and the other being a cloud service. The contents between these two locations may then be continuously synchronized while the 3D environment is executing in runtime, whereby such synchronization can occur periodically according to a time period or dynamically adjusted time period, according or in response to a customer or administrator's request, upon completion of a task, saving of a document, or a threshold amount of time passing since the last synchronization, and the like, or some combination thereof. According to some embodiments, a synchronization event can involve the cloud storage being exposed to the services associated with the hosting system so that they can both read and write to the desired destination. As such, synchronized data can be realized via the virtual display provided by the XR framework discussed herein.

In some embodiments, the system is configured to generate a virtual environment to securely interact with colleagues and partners (i.e., users). In some embodiments, the system is configured to enable users to gain access to the linked information connected to the objects in the virtual environment. In some embodiments, the system is configured to display live operational information (e.g., component information) in a 3D (virtual) or other environment. In some embodiments, the system is configured to enable multiple device types to connect, allowing a variety of rich interactions which include viewing different perspectives and/or viewing the same perspectives, as well as manipulations of items in the virtual environment. In some embodiments, the system includes real time collaboration, multiple hardware device support or a semantic collation of information in a knowledge graph.

In some embodiments, the system comprises module components that enable configuration and can create customized applications. In some embodiments, the module components include XR meta modules. In some embodiments, XR meta modules include a "meta" script (i.e., glue code). In some embodiments, the XR meta modules can be used as single independent and customizable components. In some embodiments, one or more XR meta modules include with pre-configured variables. In some embodiments, each variable is calibrated for one or more situations. In some embodiments, one or more hardware components (e.g., Desktop, Touch, VR, HoloLens, Mobile, etc.) are tested and calibrated to give the best user experience.

In some embodiments, the XR meta modules are independent from the applications, and can be easily maintained and customized through a Low Code or No Code approach for the end users while creating the desired data exchange interaction. In some embodiments, these modules are ready to use, with very low configuration effort but with many customizations available. In this way, the system creates a common standard that easily suits most or all of the user's requests according to some embodiments. FIG. 2 illustrates three non-limiting examples of platforms integrated into the system according to some embodiments.

In some embodiments, the system is configured to generate and/or display process simulation. In some embodiments, process simulation includes first principles based models. In some embodiments, the system is configured to be integrated with a secure, managed, software-as-a-service (SaaS) solution for collecting, storing, and visualizing industrial data for faster, smarter business decisions. A non-limiting example of a SaaS includes AVEVA Insight, which consolidates disparate data for complete visibility into how components are performing, and enables users, throughout an organization, to access data from anywhere.

In some embodiments, the (XR) modules are micro and/or independent components that enable a user to configure the system as a customized application. In some embodiments, the modules are independent from templates. In some embodiments, the modules can be easily customized and/or maintained at the source within the 3D environment executing in runtime.

As such, according to some embodiments, data can be generated, identified and/or scaled from a cloud source location and provided to a multitude of platforms, which can include, but is not limited to, another cloud, and/or any type of known or to be known device capable of displaying 3D data, as discussed herein (e.g., smart phone, tablet, desktop, laptop wearable, and the like).

According to some embodiments, a method is disclosed for an interactive, immersive extended reality environment for the control, configuration and management of industrial assets, spaces and products. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for an interactive, immersive extended reality environment for the control, configuration and management of industrial assets, spaces and products.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

In some embodiments, the one or more non-transitory computer readable media comprise program instructions thereon that when executed cause the one or more computers to implement steps that include to generate, by the one or more processors, a development environment configured to enable a user to create a 3D virtual representation of a physical environment. Some embodiments include a step to link, by the one or more processors, the development environment to one or more external modules. Some embodiments include a step to import, by the one or more processors, source data from the one or more external modules into the development environment. Some embodiments include a step to generate, by the one or more processors, one or more virtual models that include the source data in the development environment. Some embodiments include a step to execute, by the one or more processors, a manipulation of the one or more virtual models in the development environment. Some embodiments include a step to receive, by the one or more processors, instructions to execute a change to at least one characteristic of the source data of the one or more virtual models. Some embodiments include a step to store, by the one or more processors, the change to the at least one characteristic in the one or more external modules.

In some embodiments, the change is stored in a same module from which the source data was imported. In some embodiments, the change is stored in the same module from which the source data was imported without having to export the one or more virtual models from a runtime environment. In some embodiments, the system comprises plurality of client computers. In some embodiments, each of the plurality of client computers are able to access the development environment simultaneously. In some embodiments, the system is configured to enable each of the plurality of client computers to make changes to the one or more virtual models. In some embodiments, the changes occur in the one or more virtual models as the changes are implemented in the development environment.

In some embodiments, the system includes a plurality of client computers and a connection platform. In some embodiments, the connection platform is configured to enable the plurality of client computers to access the development environment. In some embodiments, the development environment is not executing in a runtime of any of the plurality of client computers. In some embodiments, changes in the development environment are automatically propagated to one or more modules stored separately from both the plurality of client computers and the development environment. In some embodiments, the changes are automatically propagated as they occur.

In some embodiments, the one or more external modules include one or more of an metaverse template module, an asset template module, a storage database, a customer upload module, and external data source module. In some embodiments, the one or more external modules includes a change management module configured for maintaining changes to virtual modules. In some embodiments, the change management module is configured to store a record of the changes in a respective external module from which the source data originated. In some embodiments, the changes are stored in the respective external module as the changes are implemented in the development environment.

In some embodiments, the system is directed to a method comprising one or more steps described herein, which include computer implemented method steps. Some embodiment include a step of identifying, by a device, information related to an endpoint, the endpoint information corresponding to an industrial location and industrial assets. Some embodiment include a step of analyzing, by the device, the endpoint information. Some embodiment include a step of determining, by the device, based on the analysis, digital representative information for the industrial location and industrial assets. Some embodiment include a step of identifying, by the device, a metaverse template. Some embodiment include a step of applying, by the device, the metaverse template the determined digital representative information. Some embodiment include a step of generating, by the device, a metaverse environment based on the application. Some embodiment include a step of rendering, by the device, the generated metaverse environment, the rendering enabling a set of users access to depicted digital representations of the industrial location and industrial assets. In some embodiments, the rendering further enables control of the design of the location and/or assets. In some embodiments, the rendering further enables real-time control of the operations of the location and/or assets.

In some embodiments, the system is described as device comprising a processor configured to identify information related to an endpoint, the endpoint information corresponding to an industrial location and industrial assets. In some embodiments, the processor is configured, by instructions stored on non-transitory computer readable media, to analyze the endpoint information. In some embodiments, the processor is configured to determine, based on the analysis, digital representative information for the industrial location and industrial assets. In some embodiments, the processor is configured identify a metaverse template. In some embodiments, the processor is configured apply the metaverse template the determined digital representative information. In some embodiments, the processor is configured to generate a metaverse environment based on the application. In some embodiments, the processor is configured to render the generated metaverse environment, the rendering enabling a set of users access to depicted digital representations of the industrial location and industrial assets.

In some embodiments, the system includes a non-transitory computer-readable storage medium tangibly encoded with computer-executable instructions that when executed by a device, perform a method. Some embodiment include a step of identifying, by the device, information related to an endpoint, the endpoint information corresponding to an industrial location and industrial assets. Some embodiment include a step of analyzing, by the device, the endpoint information. Some embodiment include a step of determining, by the device, based on the analysis, digital representative information for the industrial location and industrial assets. Some embodiment include a step of identifying, by the device, a metaverse template. Some embodiment include a step of applying, by the device, the metaverse template the determined digital representative information. Some embodiment include a step of generating, by the device, a metaverse environment based on the application. Some embodiment include a step of rendering, by the device, the generated metaverse environment, the rendering enabling a set of users access to depicted digital representations of the industrial location and industrial assets.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

Figure 10:
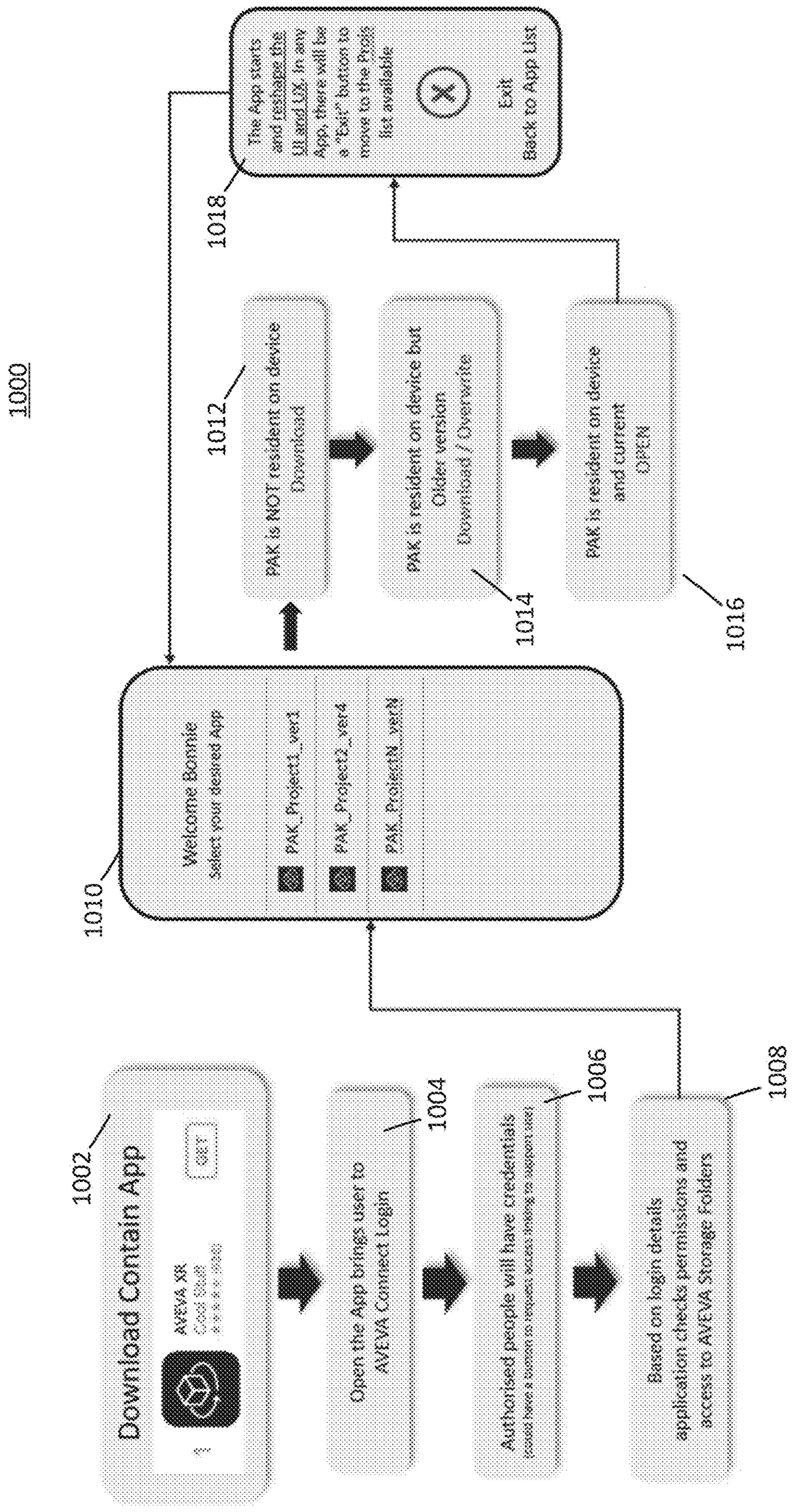
Figure 11:
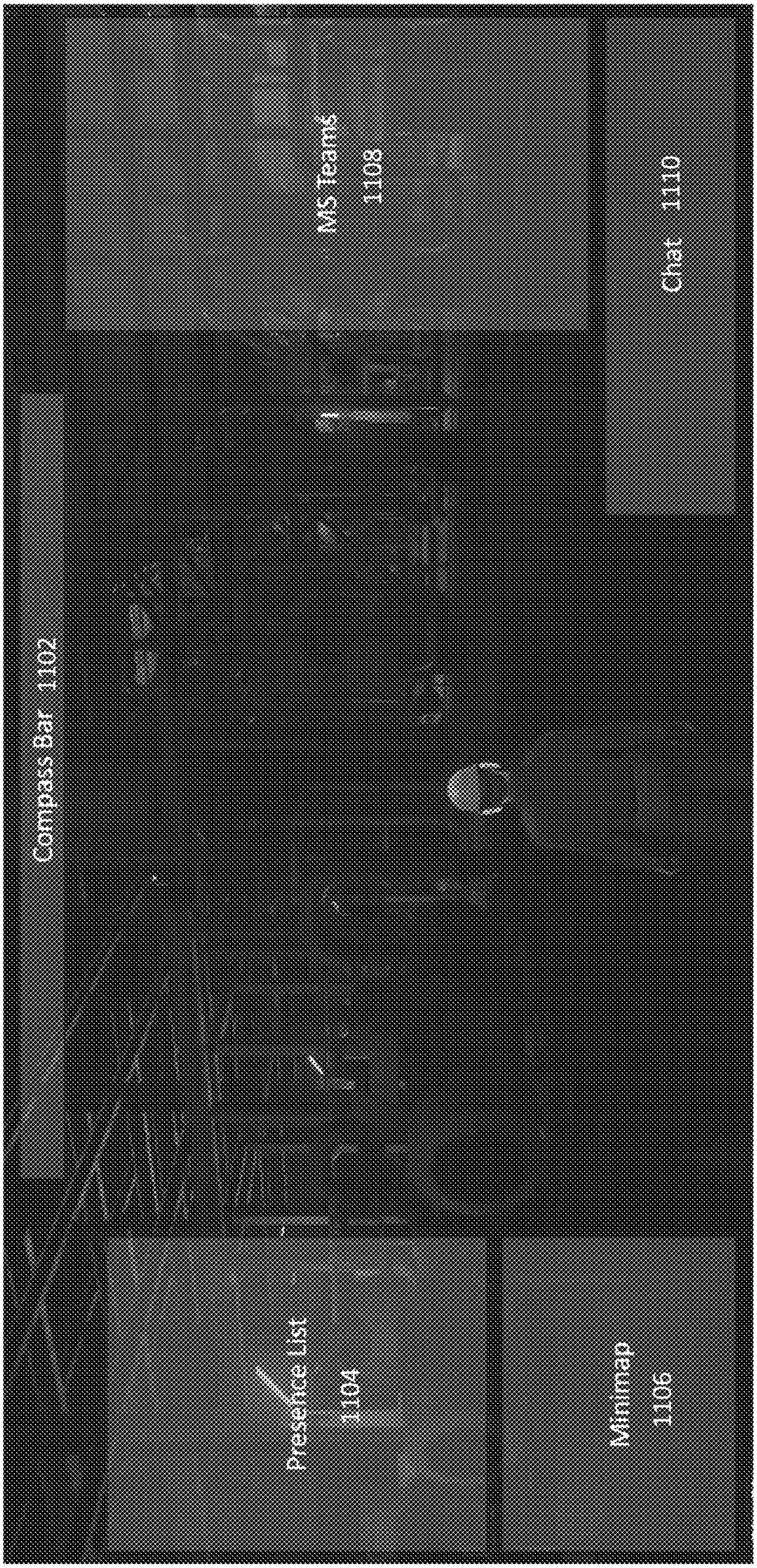
Figure 12:
Figure 13:
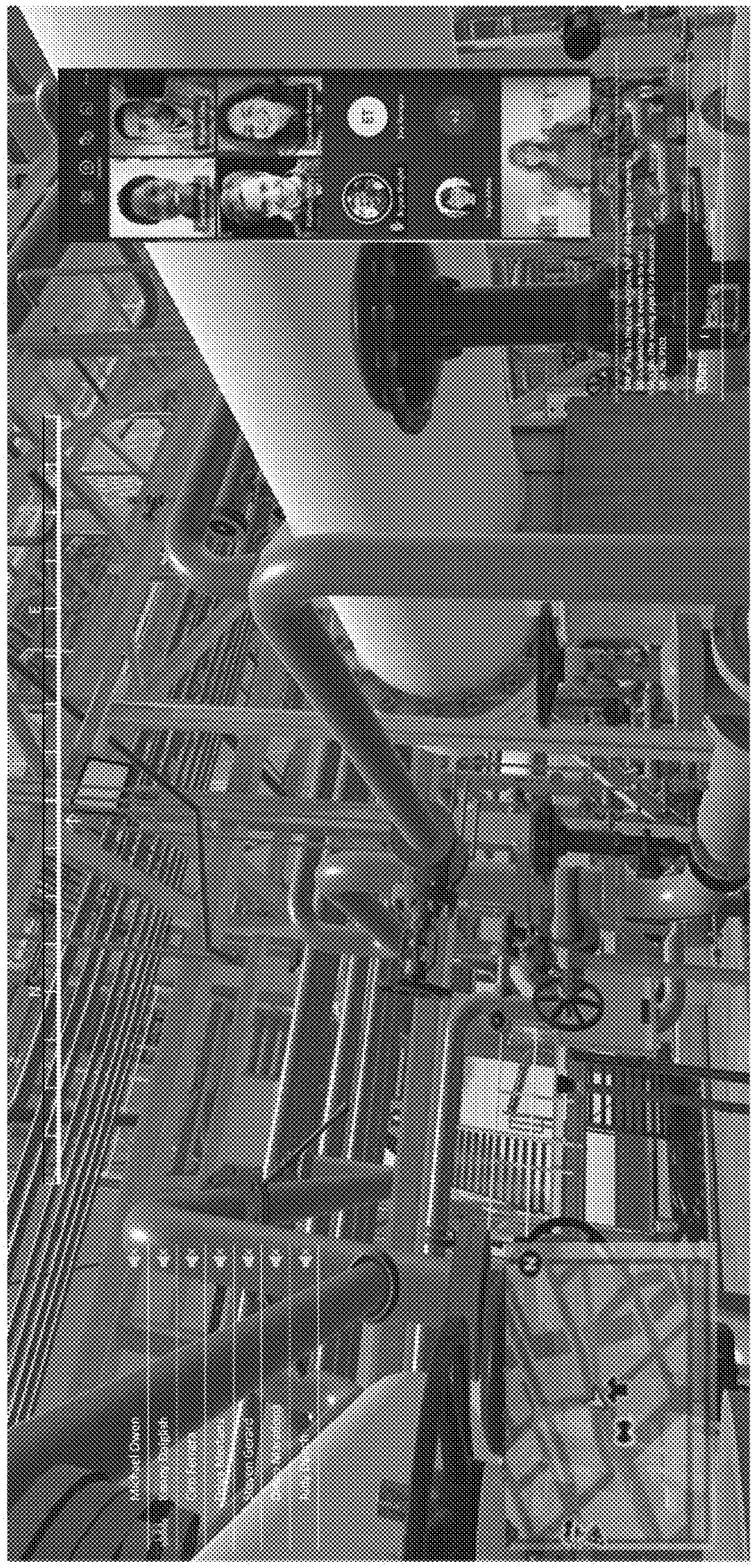
Figure 14:
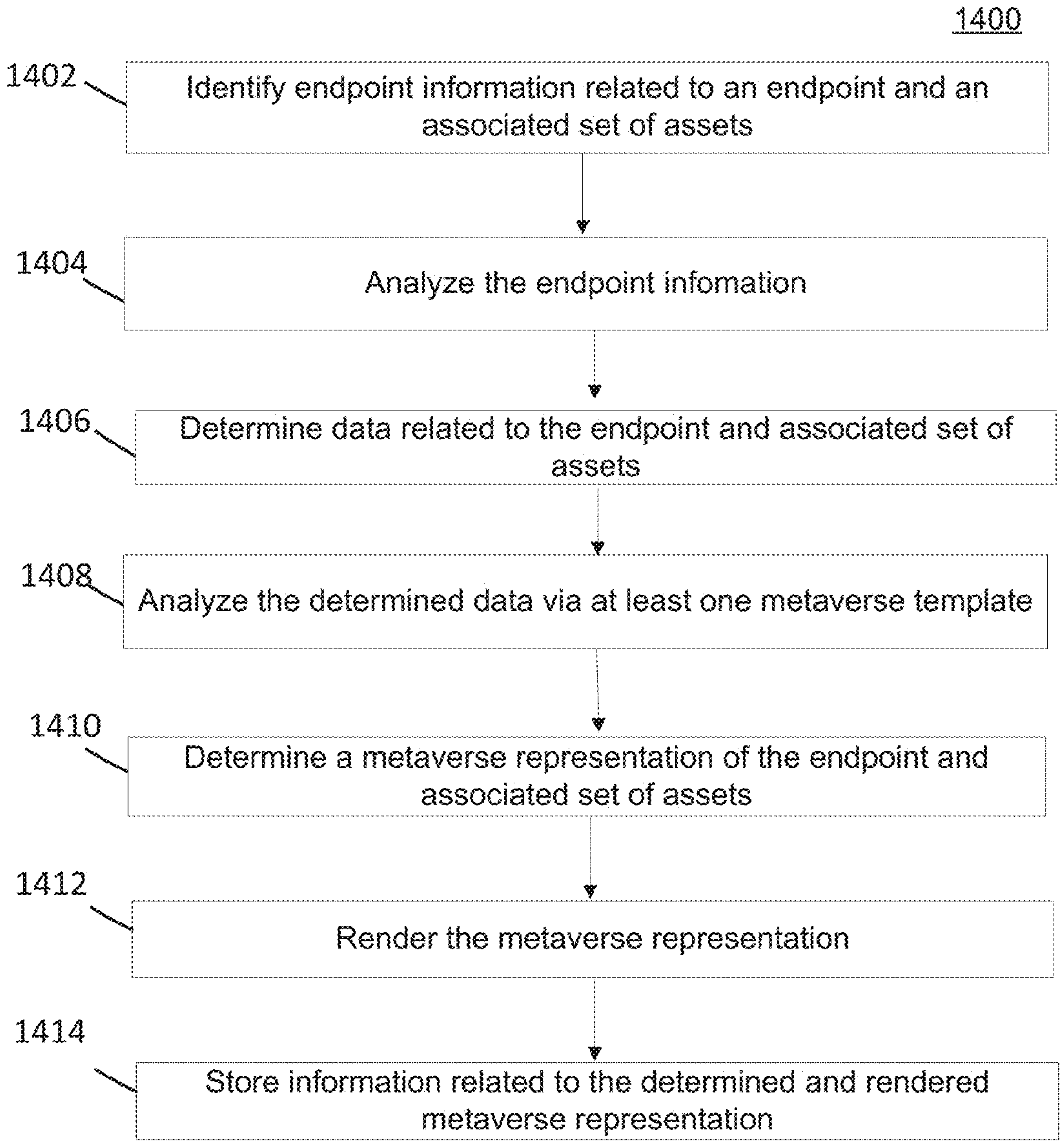
Figure 15:
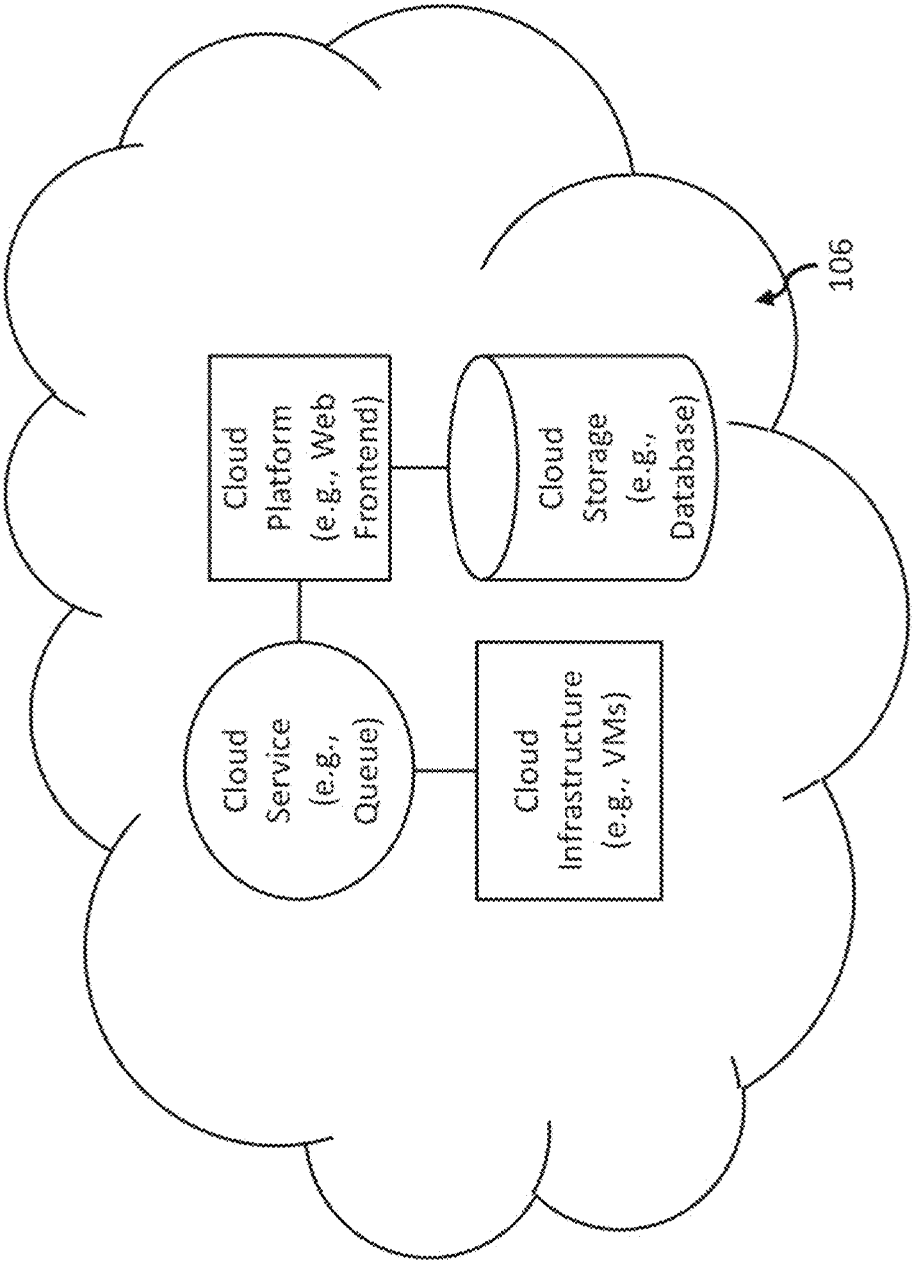
Figure 16:
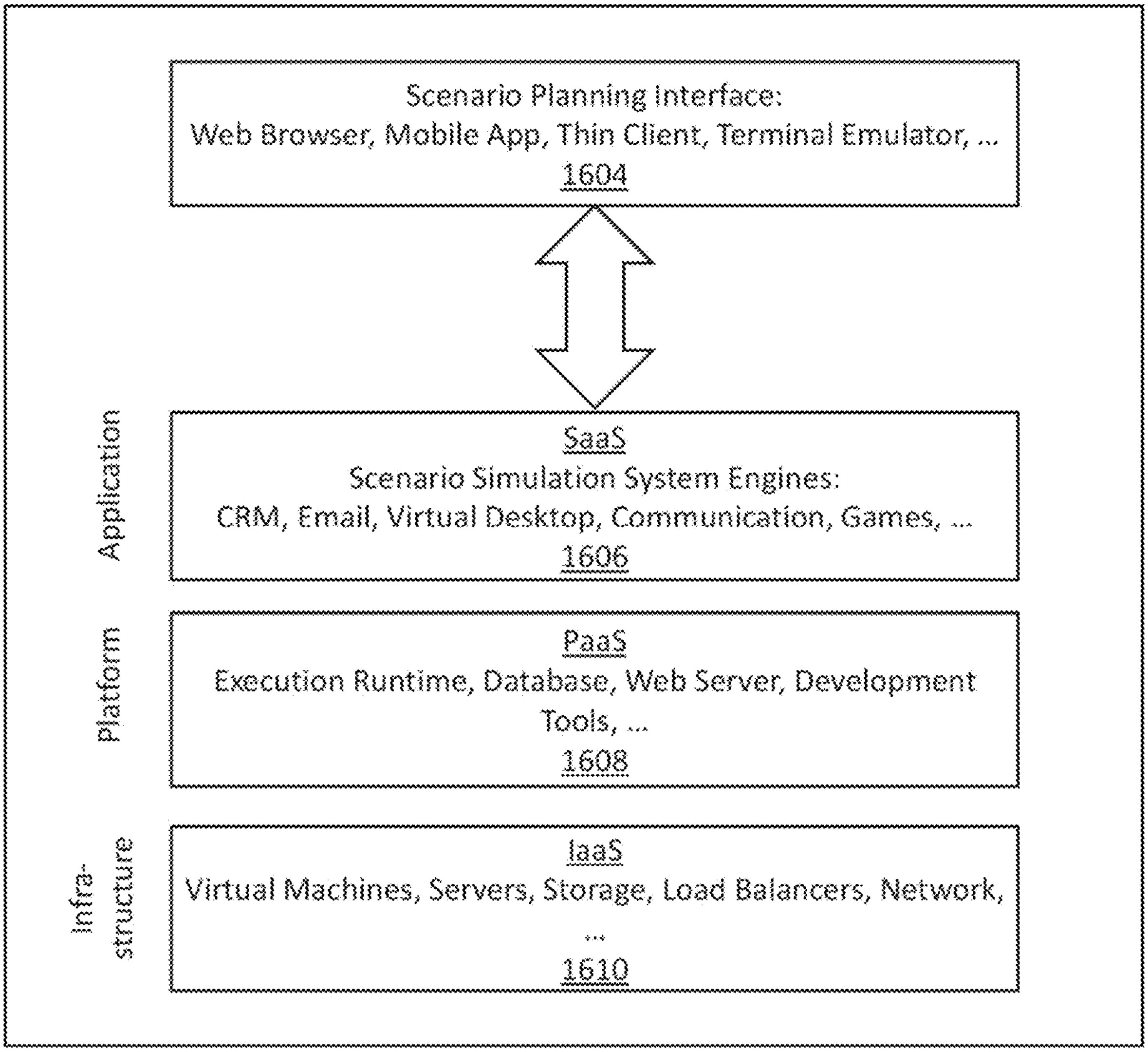
Figure 17:
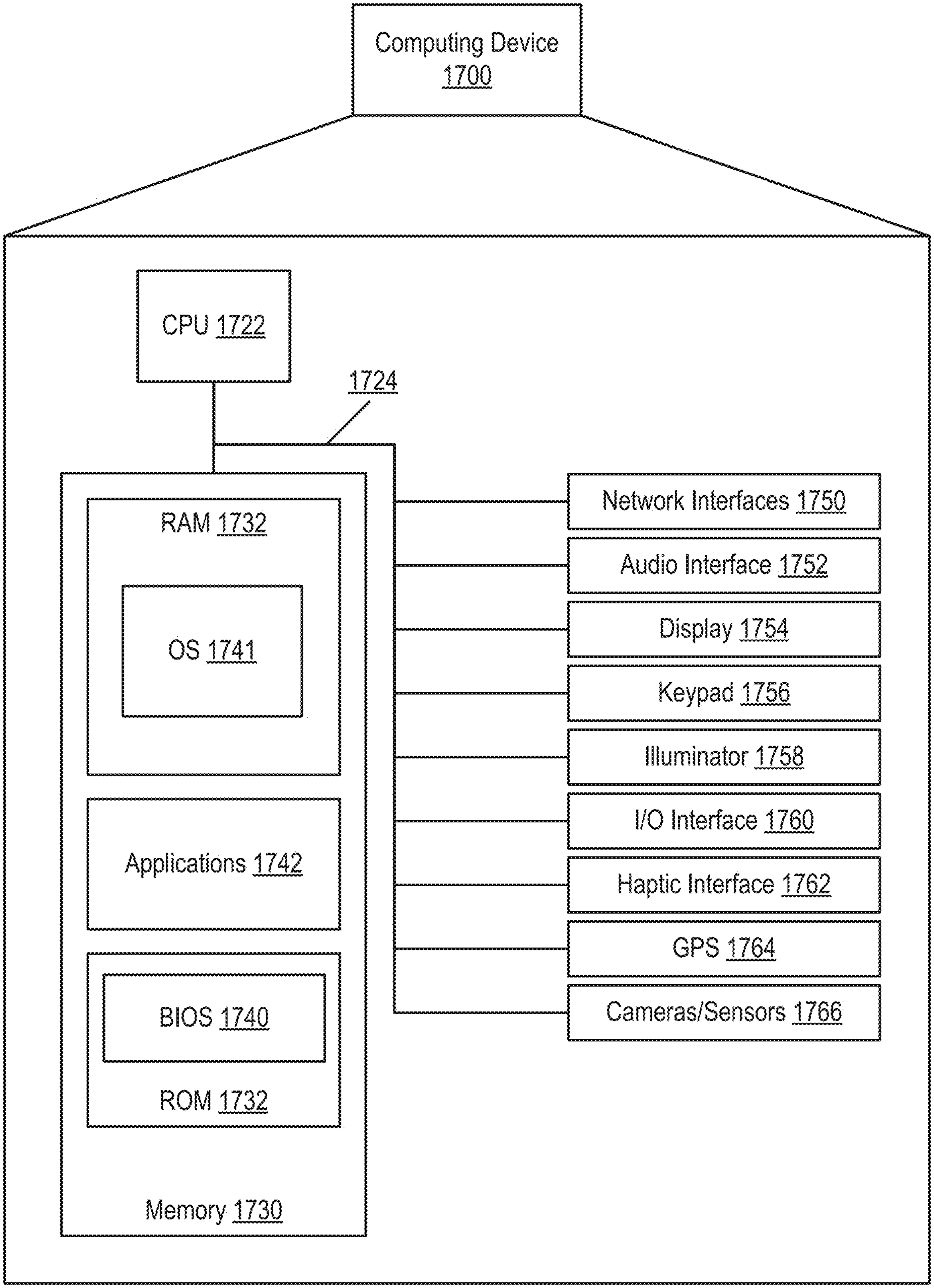

FIGS. 9A-9K provide non-limiting example embodiments for deployment of an example industrial metaverse environment according to some embodiments of the present disclosure;

FIG. 10 depicts a non-limiting example industrial metaverse environment according to some embodiments of the present disclosure;

FIG. 11 depicts a non-limiting example industrial metaverse environment according to some embodiments of the present disclosure;

FIG. 12 depicts a non-limiting example industrial metaverse environment according to some embodiments of the present disclosure;

FIG. 13 depicts a non-limiting example industrial metaverse environment according to some embodiments of the present disclosure;

FIG. 14 illustrates an exemplary data flow according to some embodiments of the present disclosure;

FIG. 15 depicts an exemplary implementation of an architecture according to some embodiments of the present disclosure;

FIG. 16 depicts an exemplary implementation of an architecture according to some embodiments of the present disclosure; and FIG. 17 is a block diagram illustrating a computing device showing an example of a client or server device used in some embodiments of the present disclosure.

DETAILED DESCRIPTION

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

In some embodiments, the disclosure is directed to a system for generating a virtual environment. In some embodiments, the system includes one or more computers comprising one or more processors and one or more non-transitory computer readable media. In some embodiments, the one or more non-transitory computer readable media comprise program instructions stored thereon that when executed cause the one or more computers to implement one or more computer steps described herein.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or $2^{nd}$, $3^{rd}$, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Figure 1:
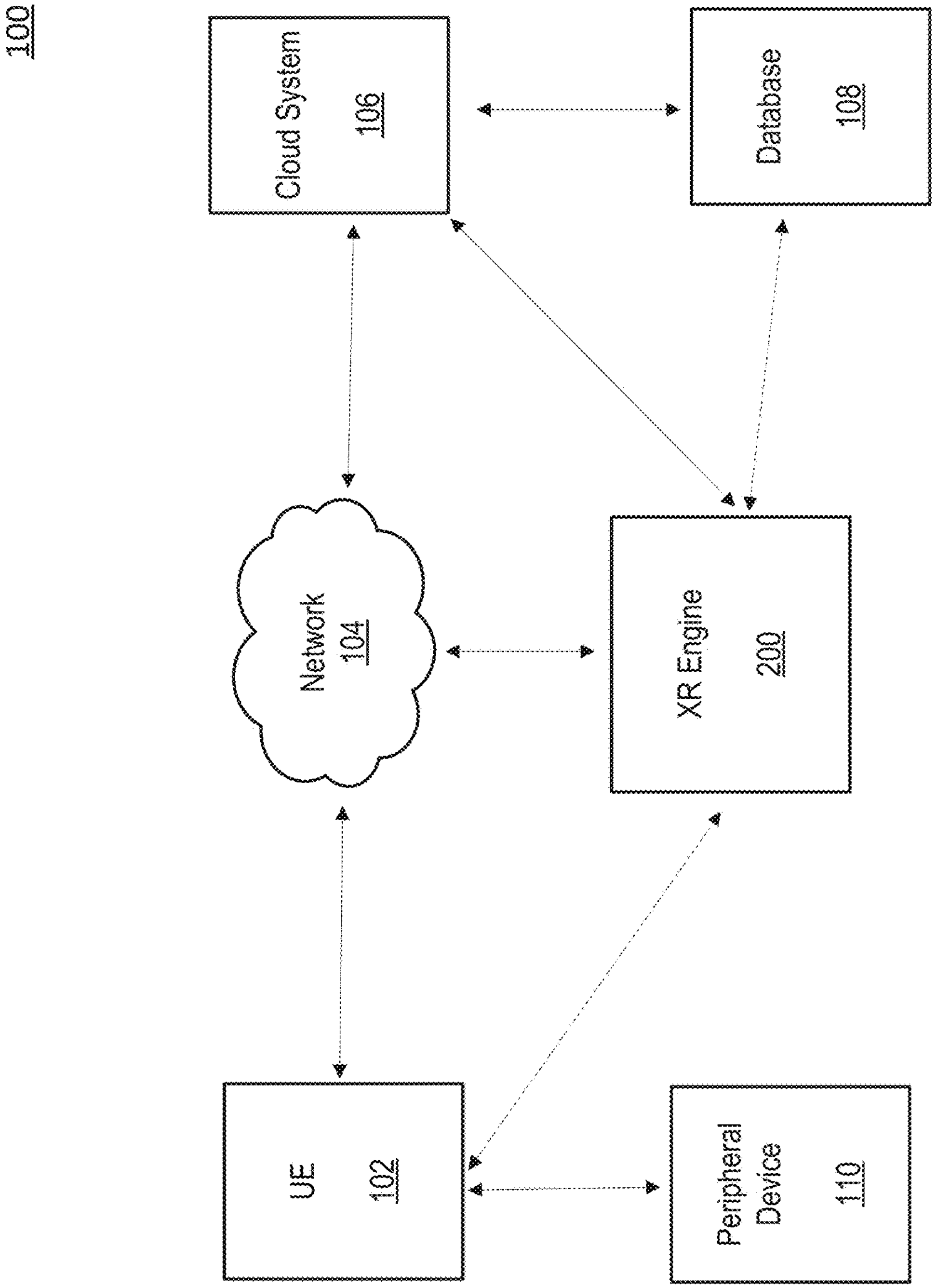
FIG. 1 is a block diagram of an example configuration within which the systems and methods disclosed herein could be implemented according to some embodiments of the present disclosure.

Certain embodiments and principles will be discussed in more detail with reference to the figures. With reference to FIG. 1, system 100 is depicted which provides an example embodiment according to components for providing the 3D virtual reality space, or industrial metaverse, as discussed herein.

According to some embodiments, system 100 includes UE 102 (e.g., a client device, as mentioned above and discussed below in relation to FIG. 17), peripheral device 110, network 104, cloud system 106, database 108, extended reality (XR) engine 200. It should be understood that while system 100 is depicted as including such components, it should not be construed as limiting, as one of ordinary skill in the art would readily understand that varying numbers of UEs, peripheral devices, cloud systems, databases and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, sensor, Internet of Things (IoT) device, autonomous machine, and any other device equipped with a cellular or wireless or wired transceiver. In some embodiments, UE 102 can be a device associated with an individual (or set of individuals) for which access to an industrial metaverse is provided. In some embodiments, UE 102 may correspond to a device having a corresponding peripheral device 110, as discussed herein.

In some embodiments, peripheral device 110 can be connected to UE 102, and can be any type of peripheral device, such as, but not limited to, a wearable device (e.g., smart watch), printer, speaker, sensor, and the like. In some embodiments, peripheral device 110 can be any type of device that is connectable to UE 102 via any type of known or to be known pairing mechanism, including, but not limited to, Bluetooth™, Bluetooth Low Energy (BLE), NFC, and the like.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture, which has associated network resources hosted on the internet or private network (e.g., network 104), which enables (via engine 200) the industrial metaverse creation, hosting and/or interaction, as discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of UE 102/device 110 and the UE 102/device 110, and the services and applications provided by cloud system 106 and/or XR engine 200.

In some embodiments, for example, cloud system 106 can provide a private/proprietary industrial software platform (e.g., AVEVA®), whereby engine 200, discussed infra, corresponds to the novel functionality system 106 enables, hosts and provides to a network 104 and other devices/platforms operating thereon.

Turning to FIGS. 15 and 16, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure a service (IaaS) 1610, platform as a service (PaaS) 1608, and/or software as a service (SaaS) 1606 using a web browser, mobile app, thin client, terminal emulator or other endpoint 604. FIGS. 15 and 16 illustrate schematics of non-limiting implementations of the cloud computing/architecture(s) in which the exemplary computer-based systems for administrative customizations and control of network-hosted APIs of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL).

According to some embodiments, database 108 may correspond to a distributed ledger of a distributed network. In some embodiments, the distributed network may include a plurality of distributed network nodes, where each distributed network node includes and/or corresponds to a computing device associated with at least one entity (e.g., the entity associated with cloud system 106, for example, discussed supra). In some embodiments, each distributed network node may include at least one distributed network data store configured to store distributed network-based data objects for the at least one entity. For example, database 108 may correspond to a blockchain, where the distributed network-based data objects can include, but are not limited to, account information, medical information, entity identifying information, wallet information, device information, network information, credentials, security information, permissions, identifiers, smart contracts, transaction history, and the like, or any other type of known or to be known data/metadata related to an entity's and/or user's information, structure, business and/or legal demographics, inter alia.

In some embodiments, a blockchain may include one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a digital chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that may be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain.

In some embodiments, exemplary distributed blockchain-type ledger implementations of the present disclosure with associated devices may be configured to affect transactions involving Bitcoins and other cryptocurrencies into one another and also into (or between) so-called FIAT money or FIAT currency, and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that may be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

FIGS. 4-7 illustrate the modularity of the system, where various platforms and modules can be stored at different locations based on customer need.

XR engine 200, as discussed above and further below in more detail, can include components for the disclosed functionality. According to some embodiments, XR engine 200 may be a special purpose machine or processor, and can be hosted by a device on network 104, within cloud system 106 and/or on ULE 102 (and/or peripheral device 110). In some embodiments, engine 200 may be hosted by a server and/or set of servers associated with cloud system 106.

According to some embodiments, as discussed in more detail below, XR engine 200 may be configured to implement and/or control a plurality of modules, services and/or microservices, where each of the plurality of modules/services/microservices are configured to execute a plurality of workflows associated with performing the disclosed functionality. Non-limiting embodiments of such workflows are provided below in relation to at least FIGS. 3-13, inter alia.

Some embodiments includes a step to generate, by the one or more processors, a virtual environment comprising a three-dimensional (3D) representation of at least a portion of a physical industrial environment. Some embodiments includes a step to generate, by the one or more processors, an asset link between one or more virtual assets in the virtual environment to one or more physical assets in the physical industrial environment while in the runtime environment. Some embodiments includes a step to generate, by the one or more processors, a data link between the virtual environment and historian database while in the runtime environment, the historian database comprising asset data about the one or more physical assets. Some embodiments includes a step to generate, by the one or more processors, a virtual graphical user interface (GUI) in the virtual environment, the virtual GUI configured to enable a user to access and display the asset data in the virtual environment. Some embodiments includes a step to generate, by the one or more processors, one or more user controls in the virtual environment, the one or more user controls configured to navigate the virtual environment, select the one or more virtual assets, and/or control the virtual GUI.

In some embodiments, the system is configured to record changes in a virtual environment during runtime. In some embodiments, the system is configured to record changes in a virtual CAD environment. In some embodiments, the system is configured to store the recordings in one or more databases such as a historian database according to some embodiments. In some embodiments, the system is configured to only store changes in the virtual environment. In some embodiments, by only storing the changes in the virtual environment, valuable computer storage resources are conserved. In some embodiments, the system is configured to enable a user to fast-forward, rewind, play, and pause virtual time while in the virtual environment to witness sequential changes in the virtual environment. In some embodiments, this enables a user to witness multiple structural and/or component changes performed over the life of a project in a fraction of real time.

For example, in some embodiments, the system includes one or more analysis modules configured to provide an analysis display of raw data (e.g., time-series) data in a 3D environment. In some embodiments, the analysis display includes analysis items such as one or more charts, graphs, images, videos, statistics, and/or any conventional analysis used in industrial environments. In some embodiments, the software includes programming instructions configured to display the analysis display in the virtual environment. In some embodiments, the programming instructions are configured to enable a user to execute a manipulation of one or more analysis displays in the virtual environment.

In some embodiments, the asset data comprises at least one analytical result of raw data associated with the one or more virtual assets. In some embodiments, selecting the one or more virtual assets comprises a manipulation of a virtual asset actuator. In some embodiments, the manipulation of the virtual asset actuator results in a remote manipulation of a corresponding physical asset actuator. In some embodiments, the physical asset actuator includes one or more of a lever, a valve, a switch, and a computer setting.

According to some embodiments, as discussed above, XR engine 200 may function as an application provided by cloud system 106. In some embodiments, engine 200 may function as an application installed on a server(s), network location and/or other type of network resource associated with system 106. In some embodiments, engine 200 may function as application installed and/or executing on UE 102. In some embodiments, such application may be a web-based application accessed by UE 102 and/or devices associated with peripheral device 110 over network 104 from cloud system 106. In some embodiments, engine 200 may be configured and/or installed as an augmenting script, program or application (e.g., a plug-in or extension) to another application or program provided by cloud system 106 and/or executing on UE 102 and/or peripheral device 110.

Figure 2:
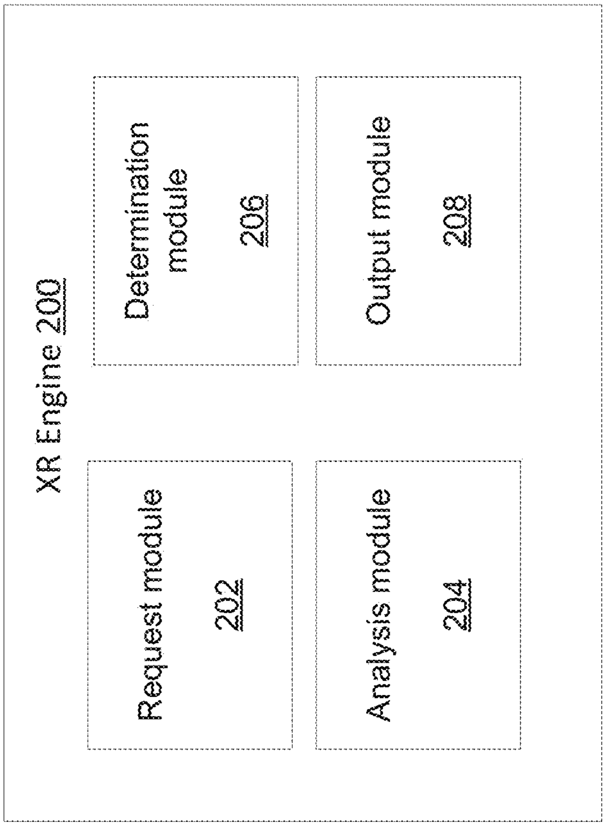
FIG. 2 is a block diagram illustrating components of an exemplary system according to some embodiments of the present disclosure.

As illustrated in FIG. 2, according to some embodiments, XR engine 200 includes request module 202, analysis module 204, determination module 206, output module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
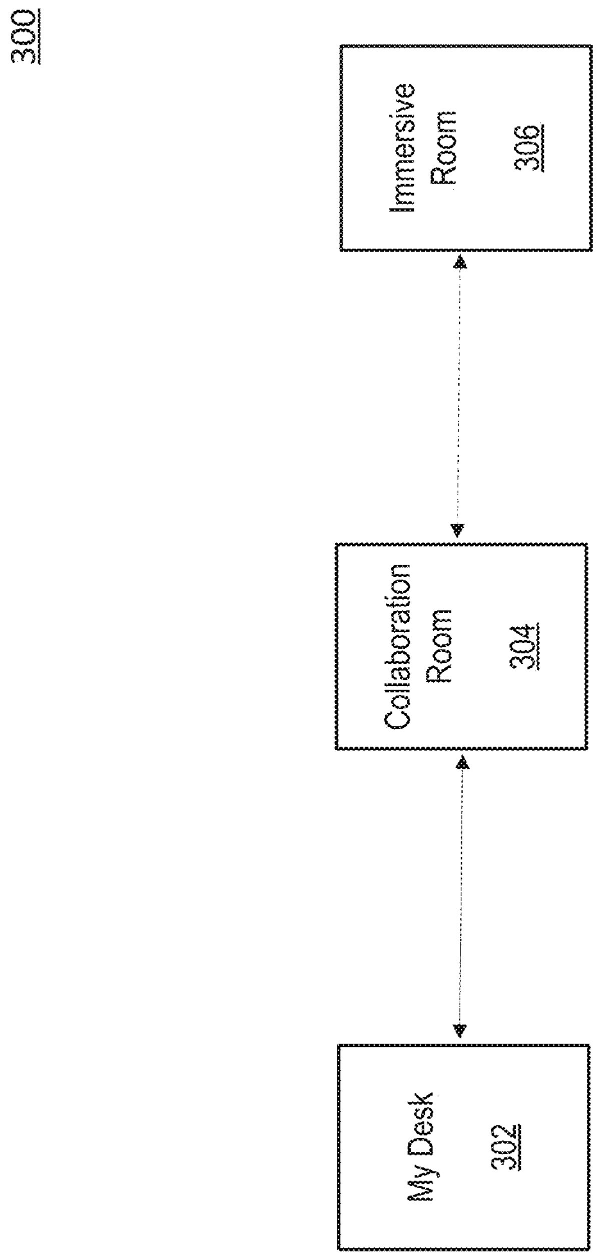
FIG. 3 depicts a non-limiting example industrial metaverse environment according to some embodiments of the present disclosure.

Turning to FIG. 3, illustrated is example operational environment for the disclosed industrial metaverse 300. According to some embodiments, the disclosed metaverse environment 300 can include a My Desk 302 feature, Collaboration Room 304 (or rooms) and Immersive Room 306 (or rooms). As discussed herein, the features provided by 302-304 enable capabilities for the 3D virtual reality, immersive environment provided via industrial metaverse 300.

According to some embodiments, My Desk 302 corresponds to a module or set of modules that enables computerized capabilities that can be enacted via a device within a hosted environment. For example, the capabilities can correspond to, but are not limited to, tool sets or took kits that UE 102 can enable within a UI, which can be inclusive of a AR, VR and/or XR UI. According to some embodiments, the tools that My Desk 302 can provide can be associated with any type of known or to be known operating system, application, program or script. For example, My Desk 302 can enable a CAD program, such as for example, AutoCAD (and/or any other type of CAD program). As such, My Desk 302 can provide capabilities for accessing, downloading and/or executing programs and/or program files associated with, but not limited to, social media, design, word processing, enterprise, cloud operations, and the like, and/or any other type of application and/or task typically associated with personal computing, for example. For example, My Desk 302 can provide Microsoft Word 365® products.

According to some embodiments, Collaboration Room 304 can correspond to a module and/or set of modules which can be provide capabilities via a UI, which can be inclusive of a AR, VR and/or XR UI. For example, according to some embodiments, Collaboration Room 304 can enable a 3D environment meeting room where users can, but are not limited to, host meetings, invite collaborators, retrieve files (e.g., from enterprise folders hosted by My Desk 302), create XR spaces corresponding to endpoints, and the like. In some embodiments, the operational programs and/or files executed by Collaboration Room 304 (and, in some embodiments, Immersive Room 306, discussed below) can be hosted, provided and/or accessible via My Desk 302.

According to some embodiments, the Collaboration Room 304 can enable, but is not limited to, the sharing, hosting, providing, creation, modification and/or storage of files (e.g., data and/or metadata) for use within the industrial metaverse. For example, such files can correspond to, but are not limited to, engineering data, operational data, maintenance data, operational views, real-time data (which can be associated with the engineering, operational and maintenance data, and the like), and the like, or some combination thereof. In some embodiments, the files, and the data associated therewith, can be stored offline and accessed via retrieval from a database; and in some embodiments, the files/data can be accessed in real-time.

In some embodiments, for example, the engineering data can be, but is not limited to, 1D, 2D, 3D, 4D and/or 5D data. For example, the 1D engineering data can correspond to and/or include 1D simulations that assist engineering users in understanding the interaction of different components within a system. Some examples of 2D data include as a table with rows and columns, like a spreadsheet, or a drawing. 3D data often involves spatial dimensions, such as length, width, and height. This spatial representation allows for a more immersive and detailed analysis, facilitating a deeper understanding of the relationships within the dataset. In scientific investigations using simulations, the 4D might include variables such as time and three spatial dimensions, where 4D data may involve measurements taken over time and three-dimensional spatial coordinates, furnishing a comprehensive representation of the phenomena being studied. 5D data might involve measurements taken over time (1 dimension), space (3 dimensions), and an additional variable, such as temperature. In physics or engineering simulations, 5D data could represent data points in a four-dimensional space and time. Accordingly, such simulations, whether 1D or 5D, for example, can provide design information for a broad range of mechanical, electronical, pneumatic and/or hydraulic industries (e.g., construction, oil refinery, shipbuilding, aerospace, automotive, and the like).

Accordingly, the engineering data can enable the renderings of the interaction of components with their surroundings (e.g., 2D/3D data), in addition to an entire design of a system and the systems components' interactions (e.g., 1D data). As such, such data can include, but is not limited to, the parameters of the models of physical assets and/or endpoint spaces (e.g., design, structure and make-up information, for example).

In some embodiments, non-limiting examples of physical components include one or more pumps, sensors, reactors, pipes, valves, heaters, stairs, tanks, vehicles, drones, lights, scaffolding, floors, ceilings, earth, water, sky, sun, moon, stars, and/or any conventional physical structure found in a real environment. In some embodiments, software includes programming instructions configured to generate one or more virtual components. In some embodiments, the one or more virtual components include a virtual rendering of one or more physical components. In some embodiments, for example, operational data can include, but is not limited to, the physical properties and the mechanisms for which assets operate within a space/endpoint. For example, such data can include, but is not limited to, PI/ADH, AIM-A/Insight, and the like.

In some embodiments, for example, maintenance data can include, but is not limited to, data integration and transformation software data which allows users to develop and execute workflows. Such data can correspond to parameters related to, but not limited to, efficiency operations, anomalies, errors, fixes, patches, and the like, or some combination thereof. In some embodiments, the maintenance data can enable intelligent asset management, which can involve, but is not limited to, SAP data and/or applications, Maximo data and/or applications, and/or any other type of application or software suite that enables maintenance operations for a digital/virtual environment, or some combination thereof.

In some embodiments, the one or more non-transitory computer readable media further comprise program instructions stored thereon that when executed cause the one or more computers to generate, by the one or more processors, one or more virtual models of the one or more physical assets in a 3D environment while executing in runtime. In some embodiments, the one or more virtual models each comprise one or more mathematical equations configured to represent a physical behavior of the one or more physical assets. In some embodiments, selecting the one or more virtual assets comprises a virtual manipulation of a virtual asset controller.

In some embodiments, the virtual manipulation causes a change in one or more variables of the one or more virtual models. In some embodiments, an effect of the change in the one or more variables is displayed in the virtual environment. In some embodiments, the effect is a virtual effect. In some embodiments, the virtual effect comprises theoretical results from calculations performed by the one or more virtual models. In some embodiments, the virtual effect does not include a change to the one or more physical assets. In some embodiments, the one or more non-transitory computer readable media further comprise program instructions stored thereon that when executed cause the one or more computers to execute, by the one or more processors, a command by the user for a physical manipulation of the one or more physical assets corresponding to the virtual manipulation after the virtual effect occurs in the virtual environment.

According to some embodiments, Collaboration Room 304 can provide functionality for, but not limited to, communication platforms (e.g., Microsoft Teams®, for example), avatar creation and display, native application/HTML desktops, VR environments (e.g., via connected VR helmets—e.g., device 102/device 110 pairing, discussed above), AR/VR/MR/VR displays, and the like. In some embodiments, Collaboration Room 304 can provide capabilities for users, via an avatar, for example, to embody different personas so as to interact with other users within the displayed UI (e.g., AR/VR/MR/VR displays). In some embodiments, Collaboration Room 304 can enable the ability to merge, display and/or visualize 3D data with any metadata associated in context within a metaverse display interface. By way of a non-limiting example, in some embodiments, such 3D data can include any type of known or to be known 3D data that can be generated (e.g., via scanning and creating 3D representations), searched and identified, requested, or otherwise identified, and can correspond to, but is not limited to, CAD, point clouds (e.g., Laser Point Clouds, for example), LiDAR, photogrammetry, meshes, parametric models, depth-maps, RGB-D, multi-view images, voxels or constructive solid geometry, and the like. In some embodiments, Collaboration Room 304 can enable the switching (or toggling) from a 3D environment to another (e.g., from/to 1:1 3D plant, for example). In some embodiments, Collaboration Room 304 can enable user management via an industrial software platform (e.g., AVEVA Connect®, for example). In some embodiments, users can be controlled via an administrator (e.g., an assigned enterprise user, for example), and can have scheduled collaborations controlled and enabled via meetings/calendars (e.g., Microsoft Teams® and Outlook®, for example).

In some embodiments, the one or more non-transitory computer readable media further comprising program instructions stored thereon that when executed cause the one or more computers to receive, by the one or more processors, one or more images of the one or more physical assets. In some embodiments, a step includes to execute, by the one or more processors, a comparison of the one or more images to one or more previous images of the one or more physical assets. In some embodiments, a step includes to execute, by the one or more processors, an identification of a visual change in the one or more images based on the comparison. In some embodiments, a step includes to alter, by the one or more processors, the one or more virtual assets in the virtual environment to reflect the visual change in the one or more images. In some embodiments, the comparison includes an execution of an artificial intelligence. In some embodiments, the artificial intelligence is trained using at least a portion of one or more previous images, where the images are labeled. In some embodiments, the one or more non-transitory computer readable media further comprising program instructions stored thereon that when executed cause the one or more computers to predict, by the one or more processors, a variable change in one or more virtual models based on the visual change recognized by the AI.

In some embodiments, selection of the one or more virtual assets in the virtual environment is configured to cause a display of a time-series graph to be generated in the virtual environment. In some embodiments, the one or more virtual assets are connected to the one or more physical assets through a software-as-a-service (SaaS) subscription program. In some embodiments, the physical industrial environment includes a supervisory control and data acquisition (SCADA) platform configured to monitor and/or control the one or more physical assets. In some embodiments, at least a portion of the SCADA can be accessed via the virtual environment during runtime without redeployment of the 3D environment.

In some embodiments, the system comprises a number of features which, when combined, deliver a virtual environment for multiple users to collaborate on engineering and operations information agnostic of their interfacing hardware. In some embodiments, information from simulation, 3D computer aided drafting (CAD), engineering data and operational sensor data is combined using a knowledge graph system and generates a visualization technology layer which presents this information for live interaction in a virtual (e.g., 3D) environment.

Accordingly, in some embodiments, such functionalities can be provided by local and/or web-hosted modules that can execute so as to realize the operational environment via metaverse 300, as discussed below at least in relation to FIGS. 10-12, inter alia.

According to some embodiments, Immersive Room 306 can enable the execution and/or collaboration of the tools accessible via My Desk 302 and operating in Collaboration Room 304. In other words, in some embodiments, Immersive Room 306 can provide an immersive, 3D virtual environment for "hands-on" design, control, management and interaction with a space, the assets associated therein and users operating within such space.

For example, as depicted in FIGS. 11-13, a set of users are interacting on a CAD design for a manufacturing plant, and the tools accessed from My Desk 302 and collaborated on in Collaboration Room 304 can include, but are not limited to, a listing of collaborators (e.g., presence list 1104 in FIG. 11) and Microsoft Teams® (e.g., MS Teams 1108 in FIG. 11). In some embodiments, a non-limiting example of CAD design can be depicted as design 1100, as illustrated in FIG. 11. In some embodiments, an avatar of a user can be provided (as depicted in FIG. 11), whereby the navigation of user within the plant can be provided via Minimap 1106 and Compass Bar 1102, which can guide the user as they virtually traverse the 3D space of the plant. In some embodiments, the traversal and/or navigation can be provided to a user as a first person and/or third person perspective, for example.

By way of non-limiting examples, FIGS. 12 and 13, and UIs 1200 and 1300, respectively, provide example depictions of an immersive design collaboration for an example endpoint, as discussed herein. For example, UIs 1200/1300 can enable multiple users to collaborate on a CAD design of a manufacturing plant. In some embodiments, for example, UIs 1200/1300 can enable the control of assets within the plant (e.g., turning on/off machinery, addressing detected anomalies, and the like, for example).

According to some embodiments, the features, tools and/or capabilities provided via the metaverse 300, as enabled via My Desk 302, Collaboration Room 304 and Immersive Room 306) can be realized via a product functionality and/or project functionality.

According to some embodiments, the metaverse 300 environment, embodied as a product, can be provided via Cloud functionality, which can allow enterprise users to scan an industrial plant and/or its associated assets so as to enable the plant and/or its assets to be reviewed and/or monitored. In some embodiments, such scanning/review can enable the replication of such plant/assets as IOs within AR/VR/MR/XR metaverse environments, where the IOs consume all standard features of the plant/assets.

Figure 4:
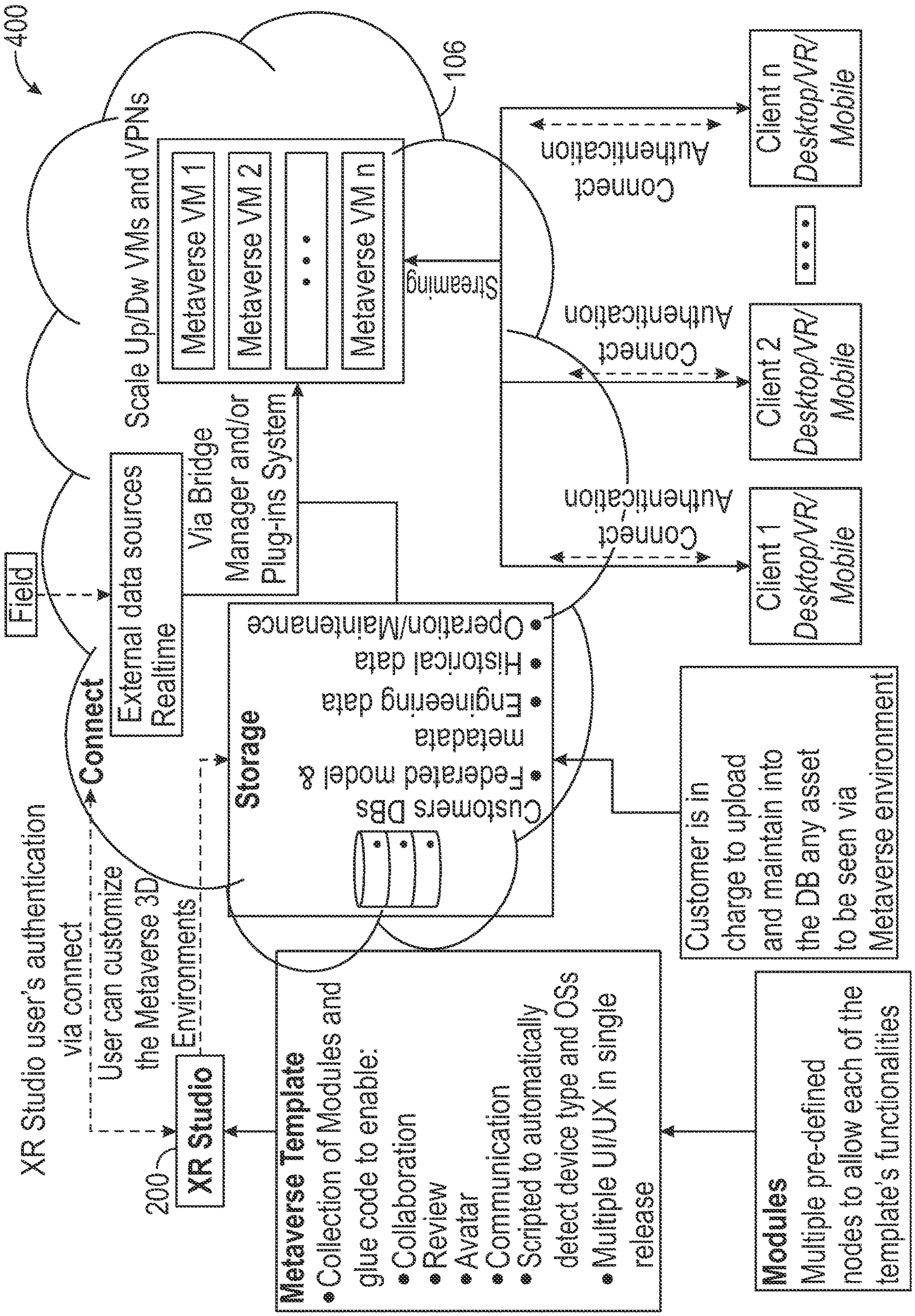
FIG. 4 depicts a non-limiting example industrial metaverse environment according to some embodiments of the present disclosure.
Figure 5:
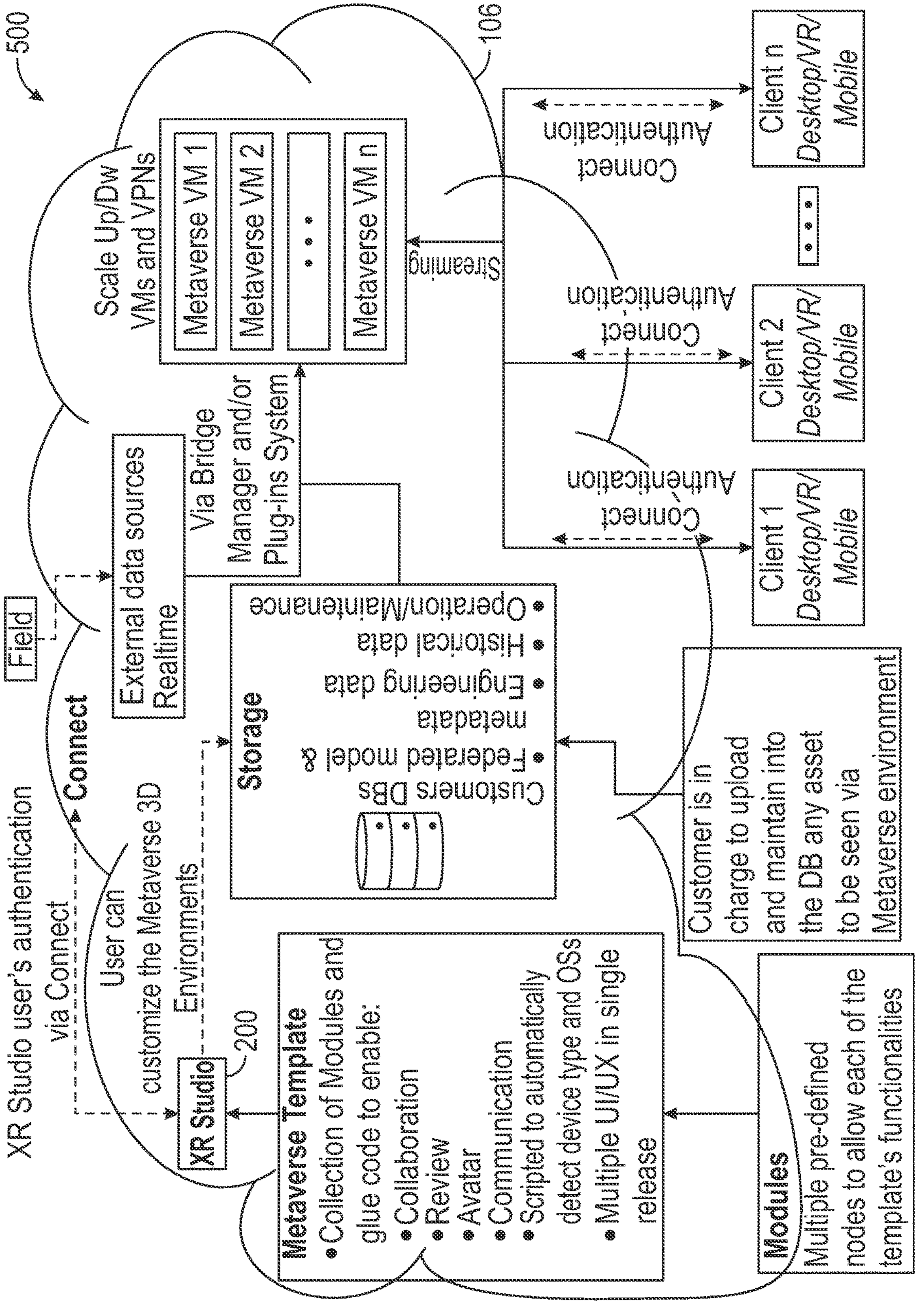
FIG. 5 depicts a non-limiting example industrial metaverse environment according to some embodiments of the present disclosure.

Accordingly, FIGS. 4 and 5 provide non-limiting configurations and components for realization of the product-based embodiments. In some embodiments, as depicted in FIG. 4, engine 200 (e.g., embodied as "XR Studio" 200) can be external to the cloud (or cloud system 106); and in some embodiments, as depicted in FIG. 5, engine 200 can be hosted and/or provided as an application/service of cloud system 106. The embodiments depicted in FIGS. 4-5 are also discussed in relation to FIG. 1, supra. In some embodiments, engine 200 may be implemented/executed and/or included in cloud 106 when extra 3D environments are required (e.g., additional information related to a plant/asset are needed to be reproduced). In some embodiments, configuration of engine 200 as a product can effectuate a low impact on system integrators (SIs).

According to some embodiments, the metaverse 300 environment, which is one as serval loadable projects, can be provided via Cloud functionality via Connect, which can allow enterprise users to view a pre-defined and published plant(s) and/or asset as a metaverse environment 300. Accordingly, the scanning/review/consumption of the plant and/or its assets can be configured as with the product, discussed above, and engine 200 can enable the engage with the space in a similar manner as discussed in relation to the Immersive Room 304 (e.g., FIGS. 10-12, for example). In some embodiments, the project metaverse 300 environment may require engine 200 to import the assets and plant information so as to enable the scripting of the plant/assets behaviors (e.g., in addition to the scripting available via a Metaverse template(s)), and to deploy the final release to the Cloud/storage. In some embodiments, this can have a high impact on SIs.

Figure 6:
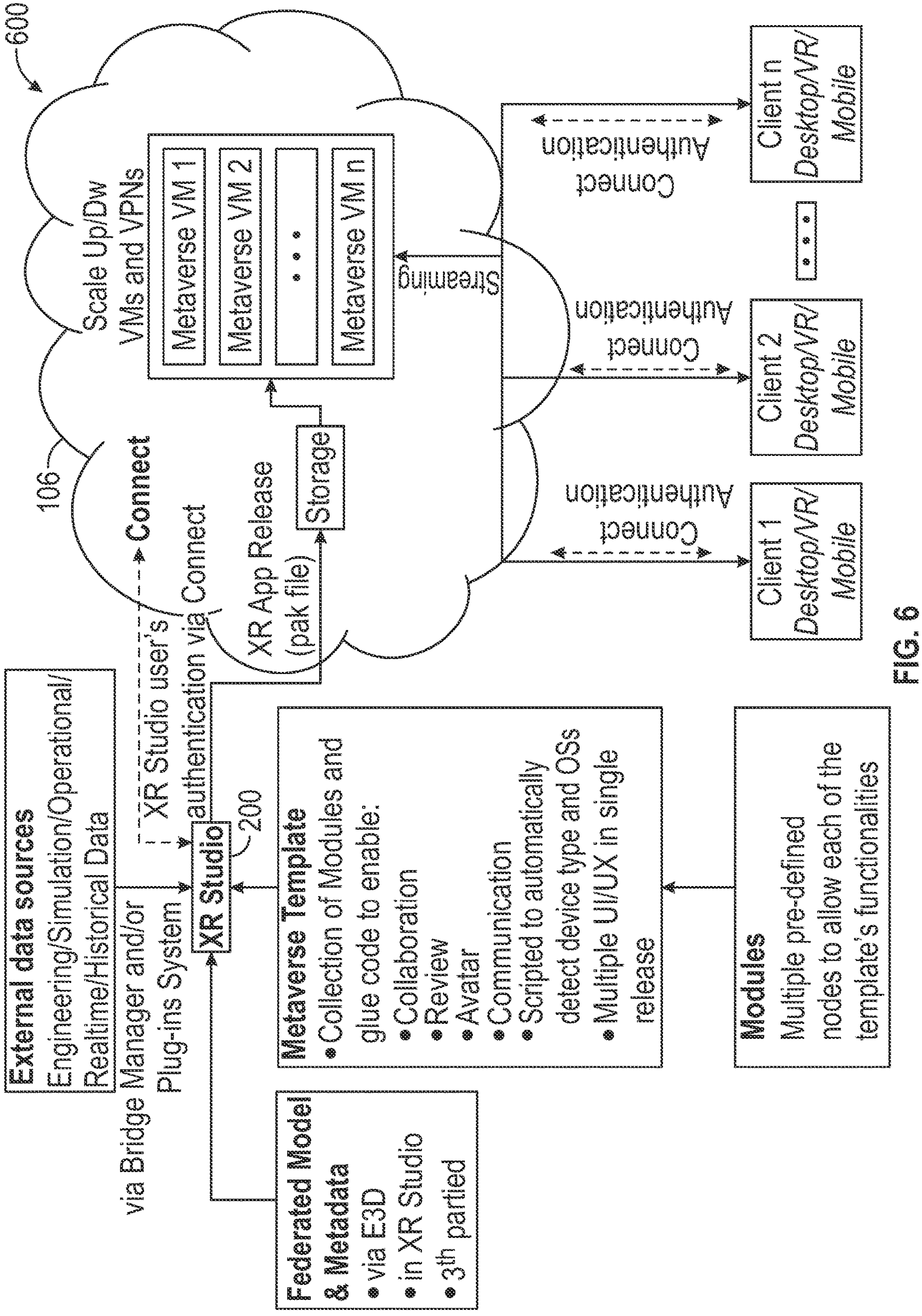
FIG. 6 depicts a non-limiting example industrial metaverse environment according to some embodiments of the present disclosure.
Figure 7:
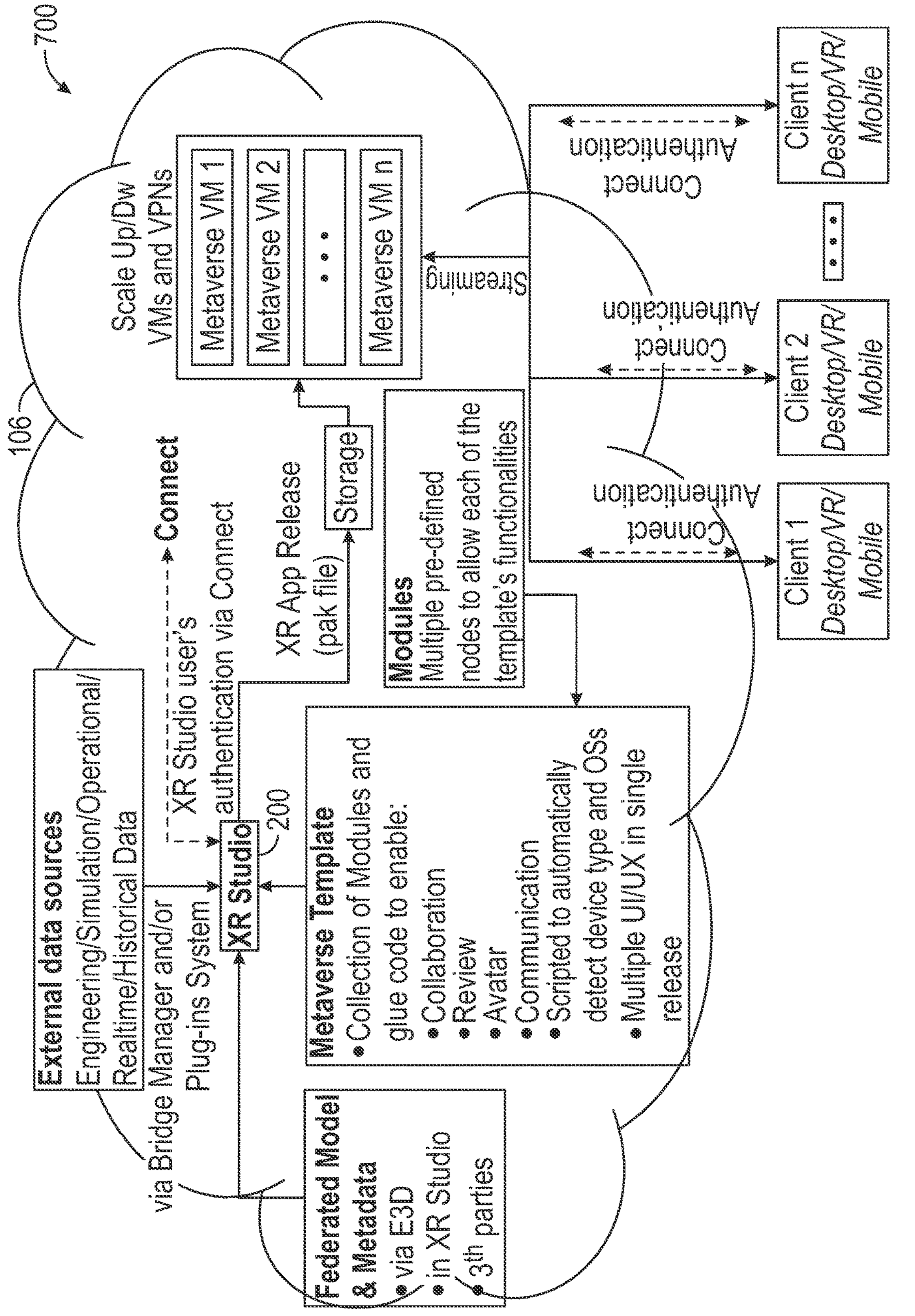
FIG. 7 depicts a non-limiting example industrial metaverse environment according to some embodiments of the present disclosure.

Accordingly, in some embodiments, FIGS. 6 and 7 provide non-limiting configurations and components for realization of the project-based embodiments. In some embodiments, as depicted in FIG. 6, engine 200 can be external to the cloud (or cloud system 106); and in some embodiments, as depicted in FIG. 7, engine 200 can be hosted and/or provided as an application/service of cloud system 106. The embodiments depicted in FIGS. 6-7 are also discussed in relation to FIG. 1, supra.

Figure 8:
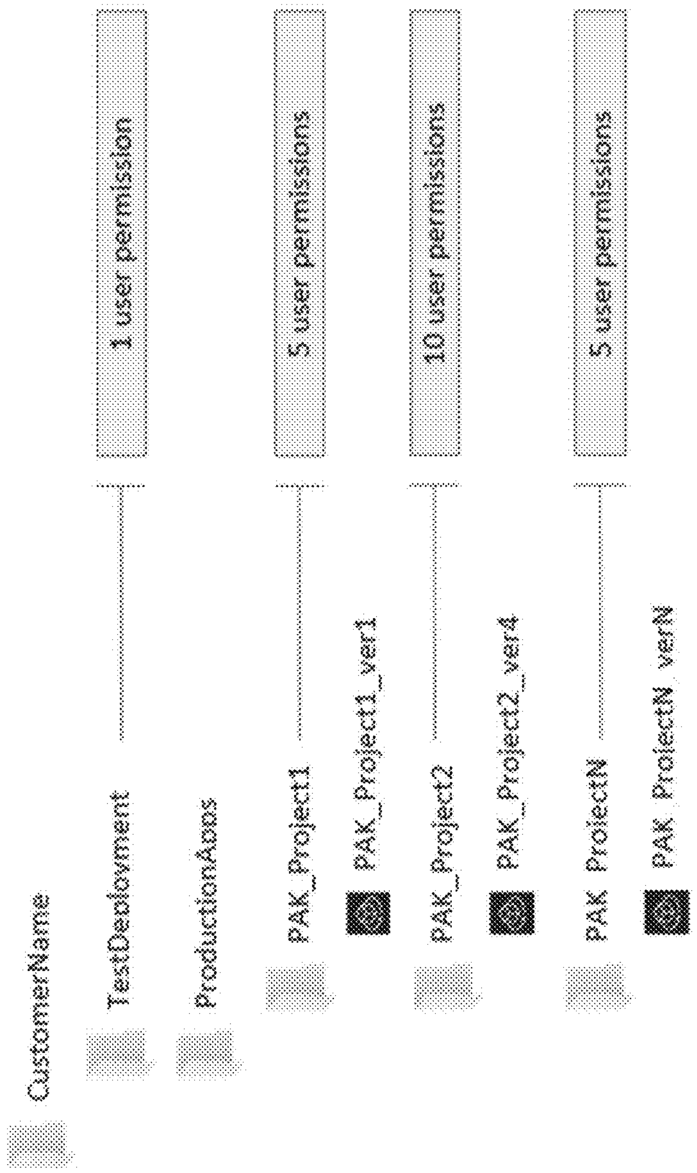
FIG. 8 depicts a non-limiting example industrial metaverse environment according to some embodiments of the present disclosure.

Turning to FIG. 8, provided is example embodiment 800 which depicts a file structure for an application container of an XR application, which in some embodiments, is an application associated with and/or providing functionality for the XR engine 200, discussed herein.

Example 800 provides a file structure for use by XR engine 200 for accessing metaverse projects and/or products that are in development and/or being processed. In some embodiments, tools capable of being accessed via UIs associated with My Desk 302 and/or Rooms 3040/306 can be structured and/or displayed in a similar manner.

For example, a file structure can be configured according to a CustomerName/TestDeployment/ProductionApps/PAK_Project1-N. In some embodiments, the CustomerName can correspond to an identifier of a user (and/or their persona). In some embodiments, each level of the structure's hierarchy can be controlled and/or managed via access rights which identifies permissions for users capable of accessing such files.

In some embodiments, TestDeployment can correspond to ongoing projects, products and/or environments (e.g., CAD designs for a plant or asset) that the user is working on and/or collaborating with other users on. In some embodiments, ProductionApps can correspond to, but are not limited to, projects, designs and/or applications the user is utilizing for specific projects/products. In some embodiments, each PAK_Project corresponds to PAK files (or project files) for specific modules, files, applications and/or programs used for and/or involved with the development of a metaverse environment respective to a project and/or product.

In some embodiments, the structure depicted in FIG. 8 can be configured to store multiple versions of files/applications so as to enable one or more environments without modifying the executing application itself. For example, the CustomerName structure depicted in FIG. 8 can be created, whereby upon creation, the device and/or operating identifiers associated with the collaborators can be extracted and leveraged for compiling different operating environment versions for each collaborator, so that when each collaborator accesses a cloud-version of the structure, they can accurately and efficiently load the files for continued execution/collaboration. For example, Android and Apple versions can be created so that Android and Apple users can execute the appropriate files.

Thus, for example, according to some embodiments, each file structure and/or project/product can be stored as a single container, with multiple sub-containers for different operating environments (e.g., operating systems, platforms, device versions, application versions, credentials, security clearance, and the like).

In some embodiments, either additionally or alternatively, the files stored within the structure depicted in FIG. 8 can be platform, source and/or destination agnostic. In some embodiments, upon a user device requesting access, the files can be formatted to the operating environment of such device (e.g., OSs and/or application versions, for example).

In another non-limiting example, the above operations respective to at least FIG. 8, as discussed herein, can be effectuated, executed and/or deployed in a cloud-to-cloud (C2C) environment. Thus, for example, specifically formatted cloud files can be pushed to specific devices according to the device's functionality (e.g., operating system, for example). Moreover, in another example, cloud files can be manipulated within a cloud so as to enable specific functionality to be performed on such files (e.g., move a file within a cloud structure for access by a streaming API that can enable cloud streaming to a particular device and/or according to a particular environment, for example).

In some embodiments, the virtual environments can be accessed via a virtual portal. In some embodiments, the development environment (e.g., XR Studio) comprises one or more portals configured to transport the user to a virtual industrial environment. In some embodiments, the one or more portals are arranged by their relative positions on a real-world map. In some embodiments, the system is configured to enable a user to customize the arrangement of the one or more portals within the virtual environment. In some embodiments, the system is configured to display one or more industrial environment summaries. In some embodiments, the system is configured to display one or more analysis displays displaying one or more industrial environment summaries adjacent to the one or more portals. In some embodiments, the system is configured to enable a user to customize one more industrial environment summaries. In some embodiments, the one or more industrial environment summaries include one or more analyses using one or more integrated systems described herein.

In some embodiments, a virtual environment file (see FIG. 8) is executed by a user passing through a first portal according to some embodiments. In some embodiments, the virtual industrial environment includes a digital twin of one or more components in a corresponding physical industrial environment. In some embodiments, the system is configured to associate the data collected from the one or more components by one or more integrated systems and/or analyzed by one or more integrated systems with each of the one or more industrial components while the 3D environment is executing in runtime, and display the associated and/or analyzed data to a user via an analysis display.

In some embodiments, the virtual industrial environment includes a digital twin of one or more components in a corresponding physical industrial environment. In some embodiments, the system is configured to associate the data collected from the one or more components by one or more integrated systems and/or analyzed by one or more integrated systems with each of the one or more industrial components, and display the associated and/or analyzed data to a user via an analysis display.

In some embodiments, the system includes a camera configured to capture one or more images from a physical industrial environment. In some embodiments, the system is configured to determine one or more component dimensions from the one or more captured images. In some embodiments, the system is configured to generate the virtual industrial environment from the one or more images. In some embodiments, the camera includes a scanner.

In some embodiments, the system is configured to generate real world environmental conditions within the virtual environment. Some non-limiting examples of real world conditions include rain, clouds, snow, and sun position according to some embodiments. In some embodiments, the system is configured display environmental conditions on one or more analysis displays.

In some embodiments, the system is configured to continuously and/or intermittently record one or more aspects of the physical industrial environment. In some embodiments, the system is configured to store the recordings in one or more databases such as a historian database according to some embodiments. In some embodiments, the system is configured to only store changes in the physical industrial environment. In some embodiments, the system is configured to use AI (e.g., AVEVA Vision AI) to determine changes in the physical industrial environment. In some embodiments, by only storing the changes in the physical industrial environment, valuable computer storage resources are conserved.

In some embodiments, the system is configured to integrate a change in the physical environment into a virtual environment as a component, image, and/or video. In some embodiments, the system is configured to combine the changes in the environment with the static components that have not changed in response to a query and/or request by a user. In some embodiments, the query is for a specific time frame. In some embodiments, the time frame is in the past. Advantageously, by recreating the physical industrial environment during a period of interest in a virtual environment, in some embodiments, the system is configured to enable a user to "travel through time" and witness from a present perspective past environmental factors integrated into the virtual environment by one or more systems described herein.

As a non-limiting example, in some embodiments, a change in the environment may include a person manipulating a component. In some embodiments, this manipulation may have not been reported by the person, yet the system enables a user to witness their existence in the past in a present perspective. In some embodiments, the system is configured to enable a person to fast-forward, rewind, play, and pause virtual time while in the virtual environment. In some embodiments, this enables a user to witness multiple physical industrial environmental changes in a fraction of real time. In some embodiments, the system is configured to correlate a time-series graph in an analysis display with changes generated in the virtual environment.

In some embodiments, the system is configured to enable a user to access components from a second virtual industrial environment while in a first industrial environment. In some embodiments, this saves time and computer resources as the user does not have to exit the first virtual environment to access items in a second virtual environment. In some embodiments, the system is configured to generate multiple analysis displays. In some embodiments, the system is configured to enable a user to display different component analysis from different virtual industrial environments while in any virtual environment according to some embodiments.

By way of a non-limiting example, FIGS. 9A-9K depict non-limiting example embodiments of a C2C deployment of the disclosed framework. Accordingly, as discussed herein, according to some embodiments as depicted in at least FIGS. 9A-9K, via XR Studio (e.g., engine 200, as discussed herein respective at least FIGS. 4-7), a package file in storage can be deployed and consumed by a metaverse application hosted in the cloud.

Figure 9A:
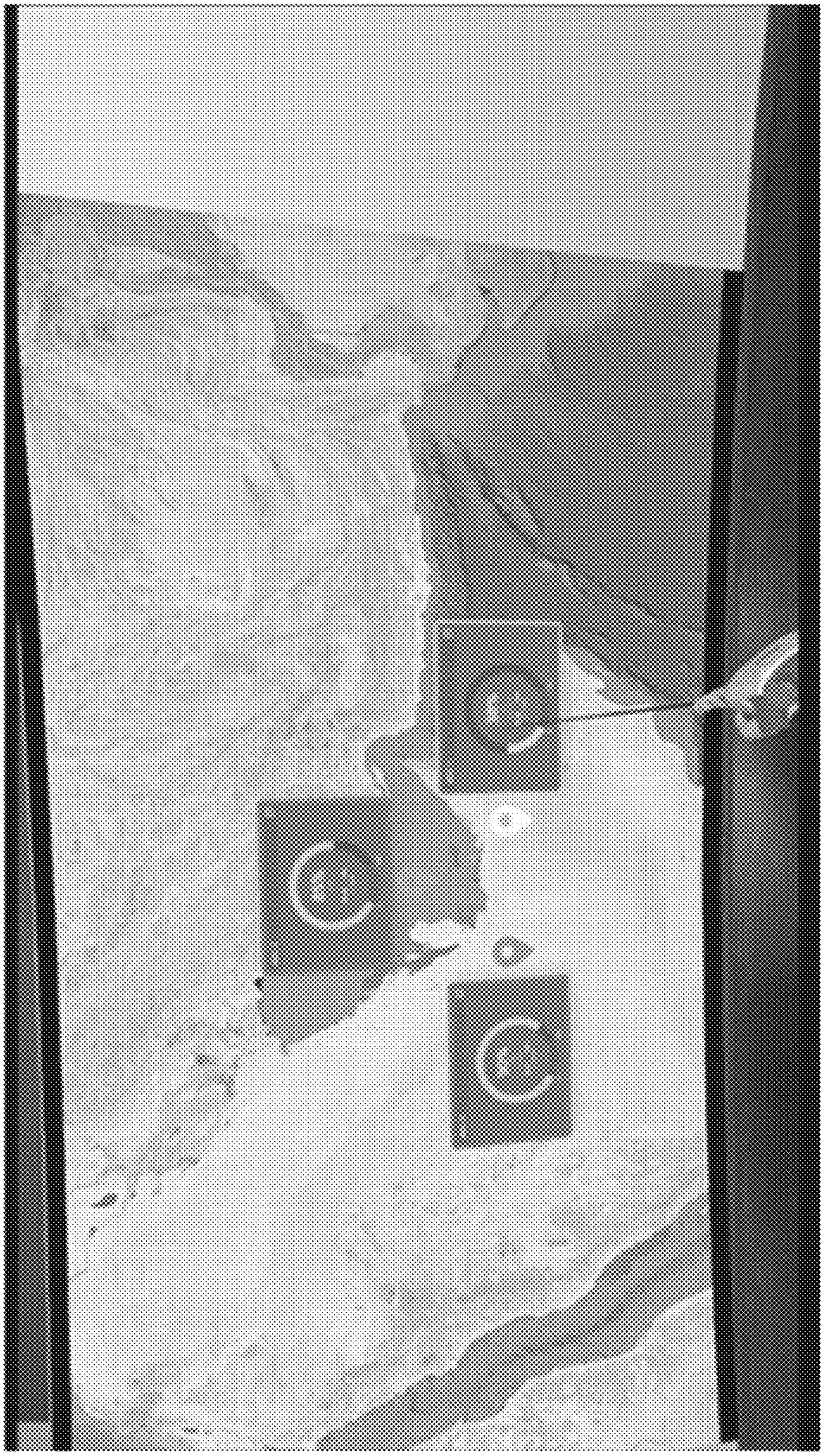
Figure 9B:
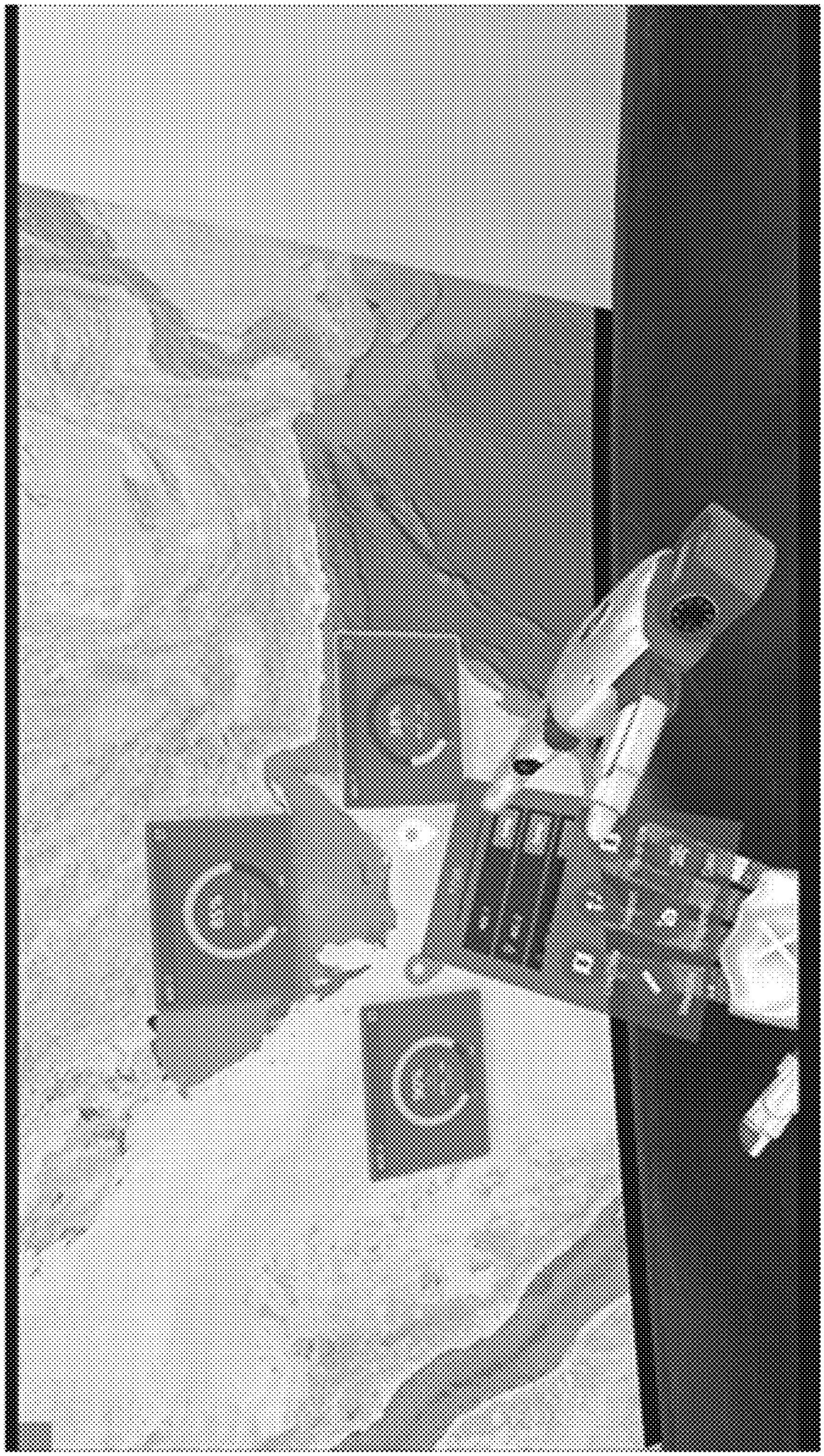
Figure 9C:
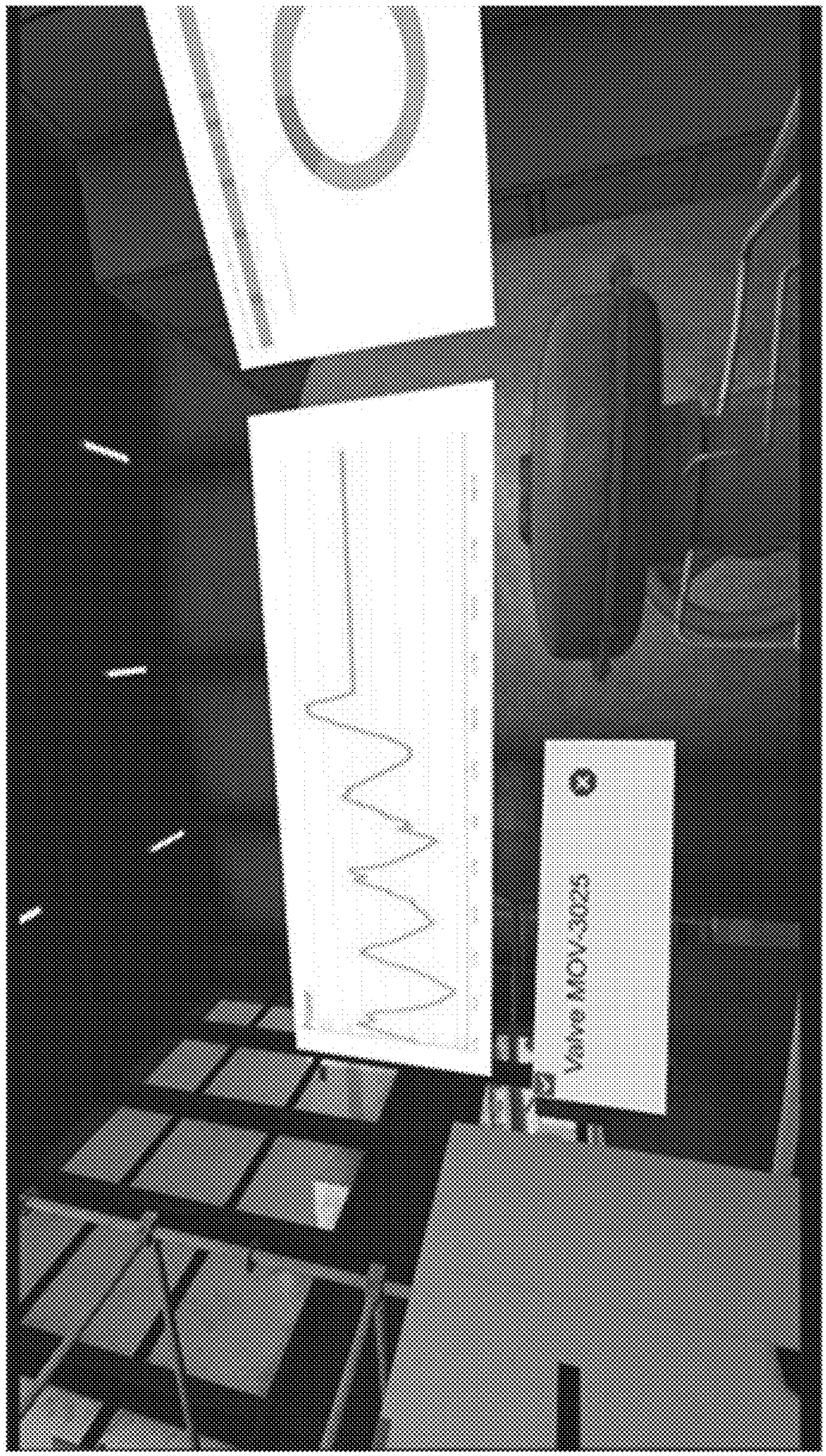
Figure 9D:
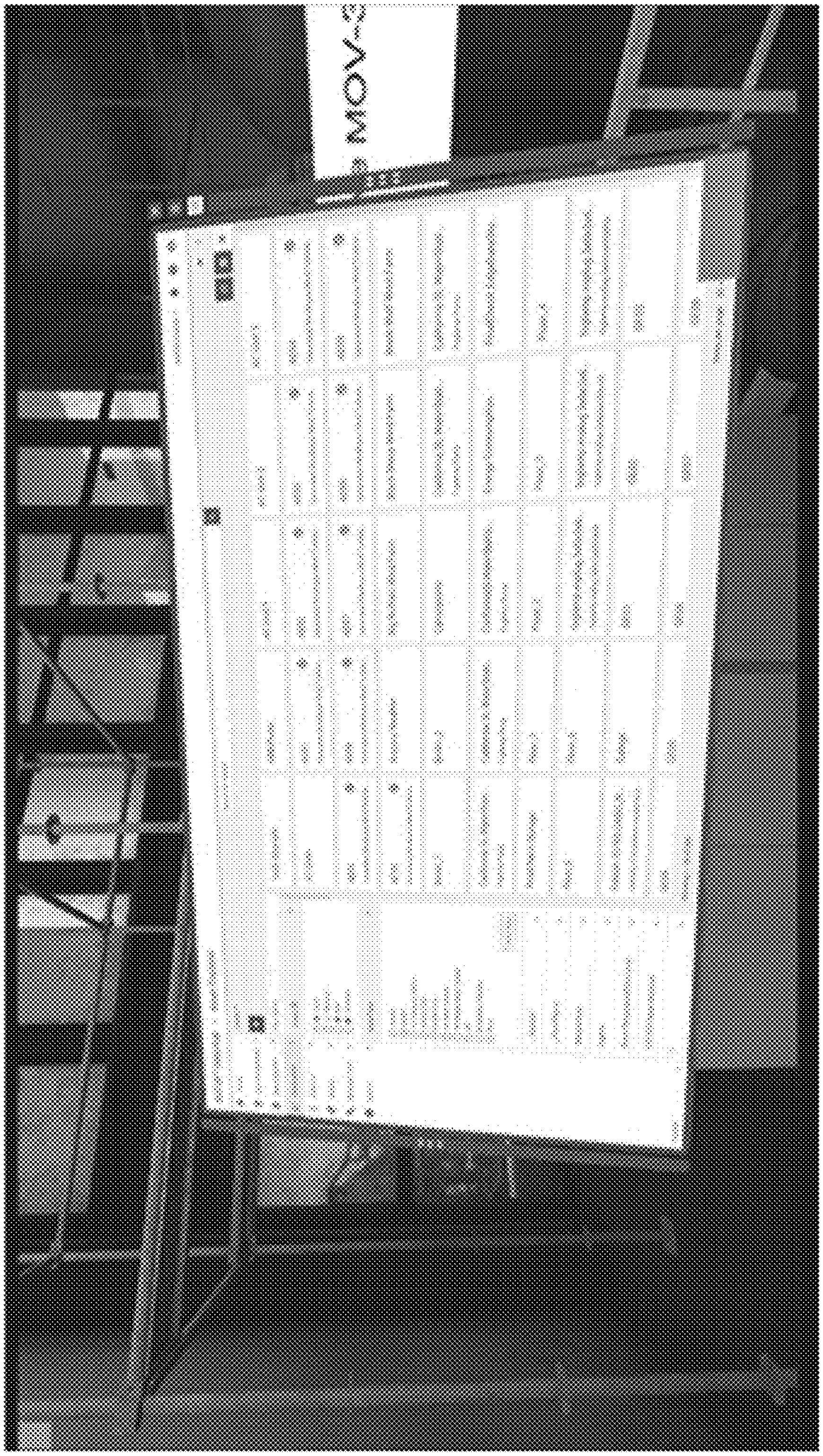
Figure 9E:
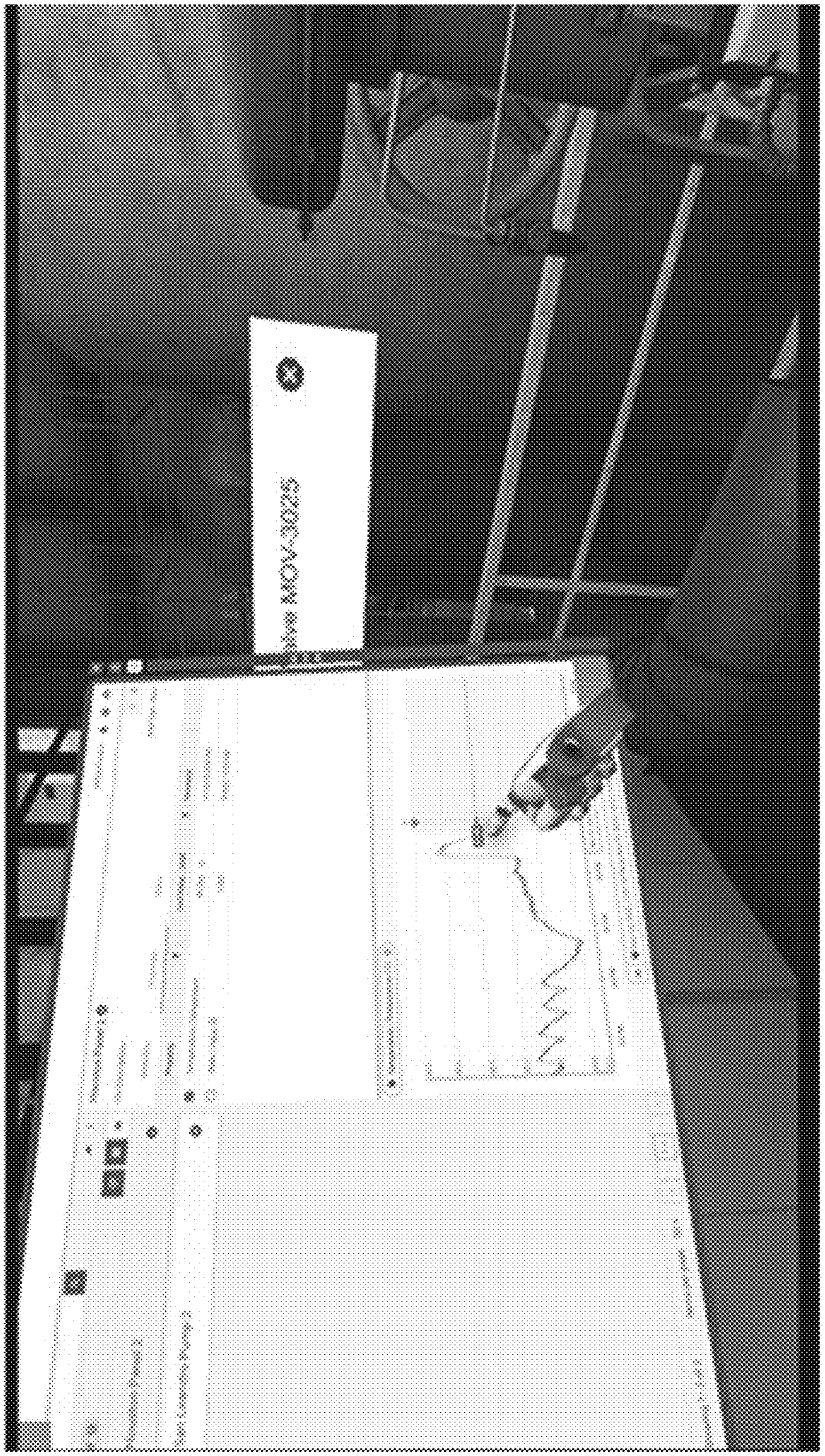

According to some embodiments, FIGS. 9A-9K depict an implementation where a location (e.g., a plant or jobsite) is selected and interaction with the real-world assets associated with the location and/or other users at and/or remotely accessing the plant can be realized. For example, in some embodiments, in FIG. 9A, depicted is an interface where a particular plant is selected from an interactive map view. In FIG. 9B, in some embodiments, a virtual model of the plant is accessed and displayed (e.g., referred to as a "digital twin"). In FIG. 9C, in some embodiments, an asset can be queried, whereby a database (or datahub) associated with operations of the asset can be queried/displayed, as in FIG. 9D. In FIG. 9E, in some embodiments, depicted is an example interaction with the queried data (from FIGS. 9C-9D), whereby, for example, the interaction can be effectuated via VR functionality, as depicted.

Figure 9F:
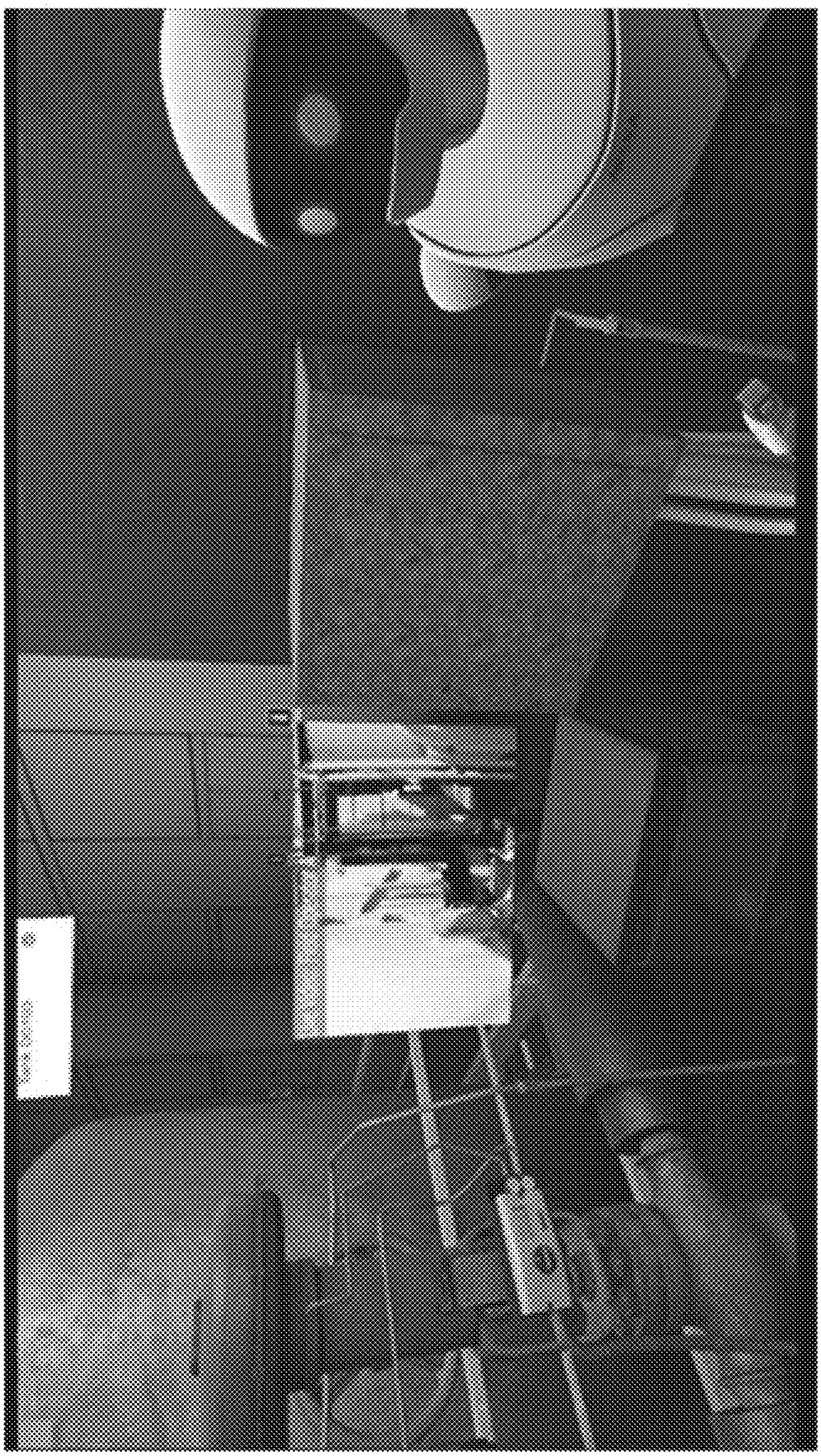

In FIG. 9F, in some embodiments, depicted is an example of interaction with another user's avatar, which can be effectuated in a VR context. In some embodiments, as depicted, a live video feed from the field can be displayed.

Figure 9G:
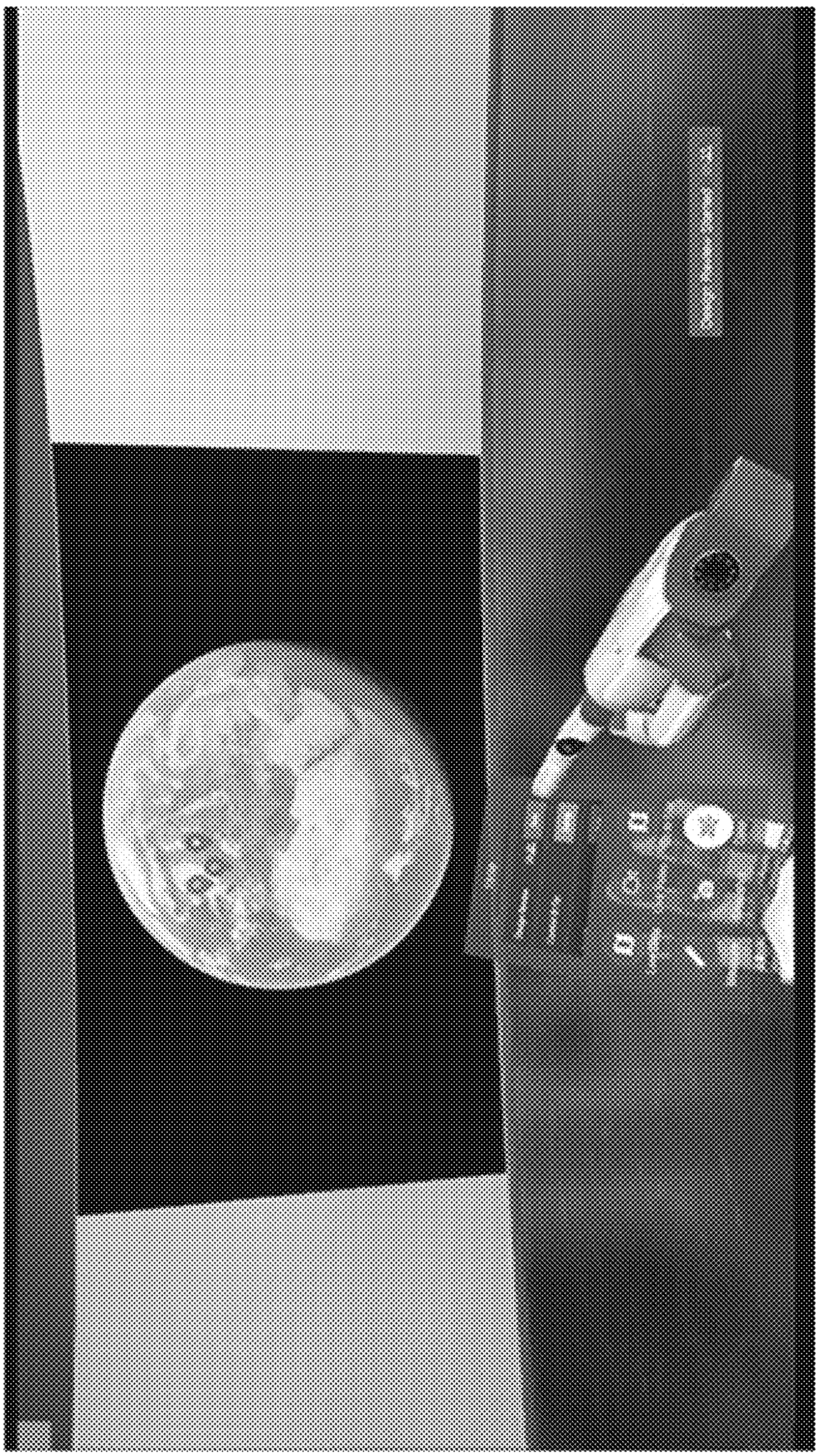
Figure 9H:
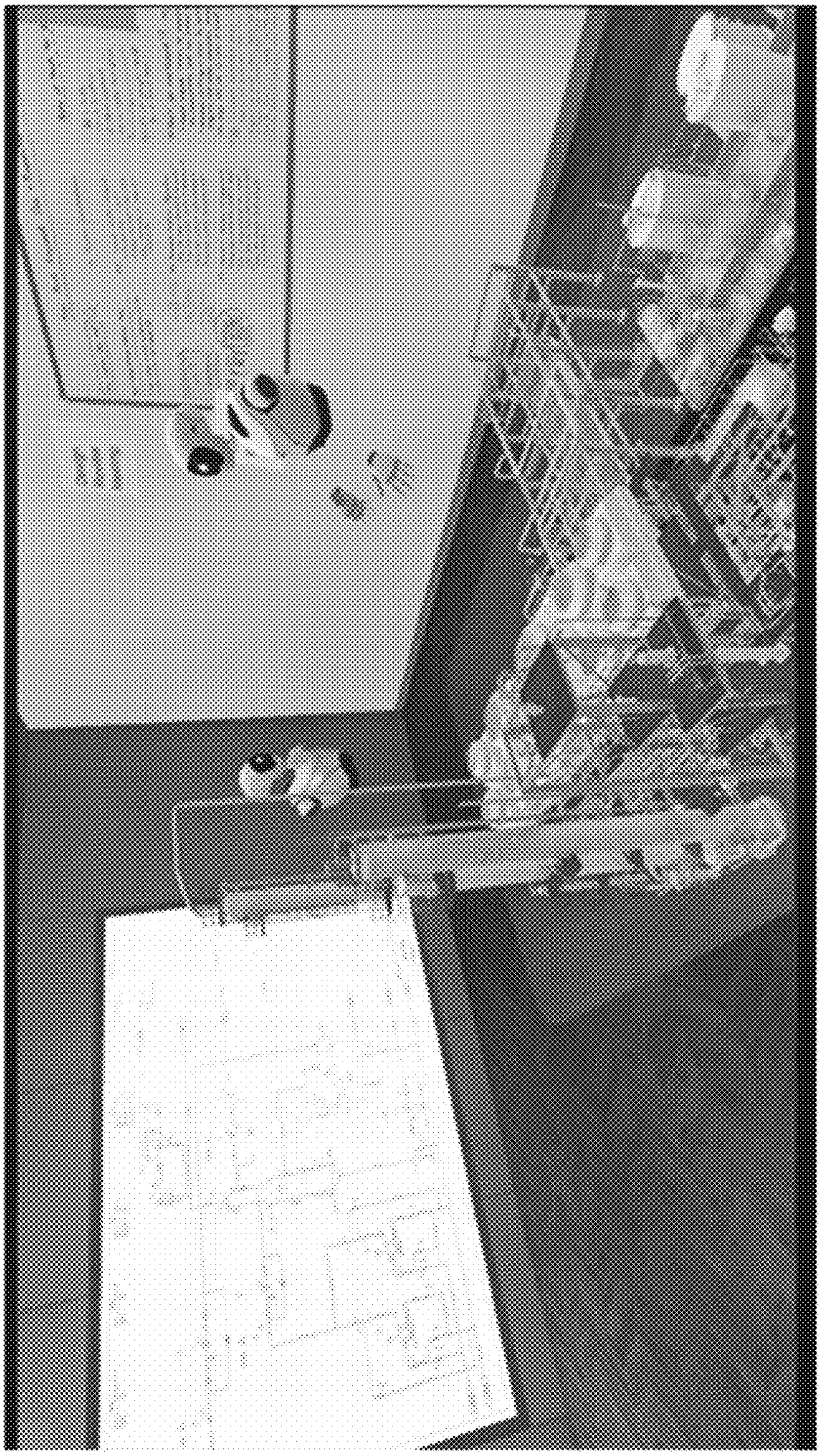
Figure 9I:
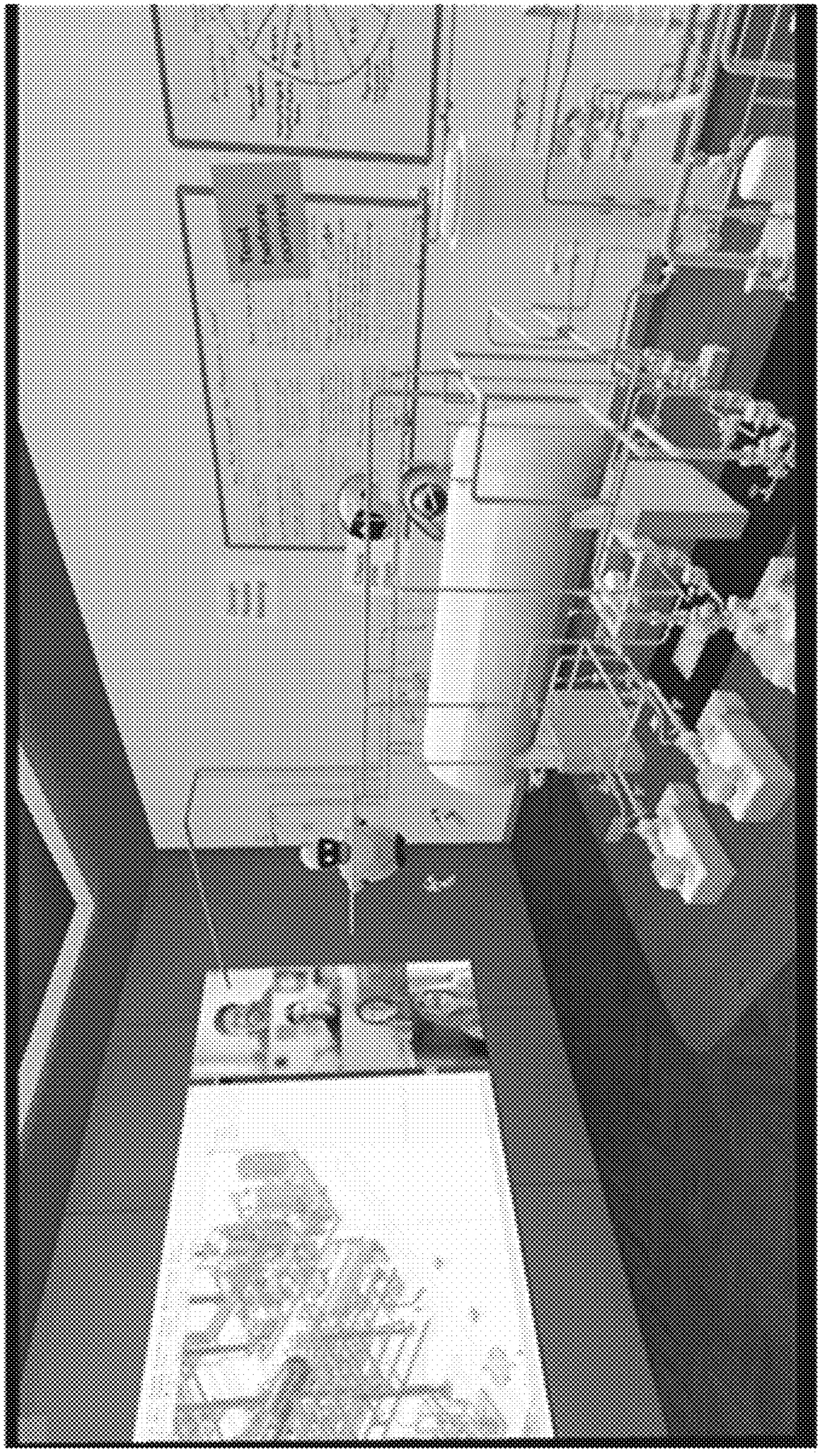
Figure 9J:
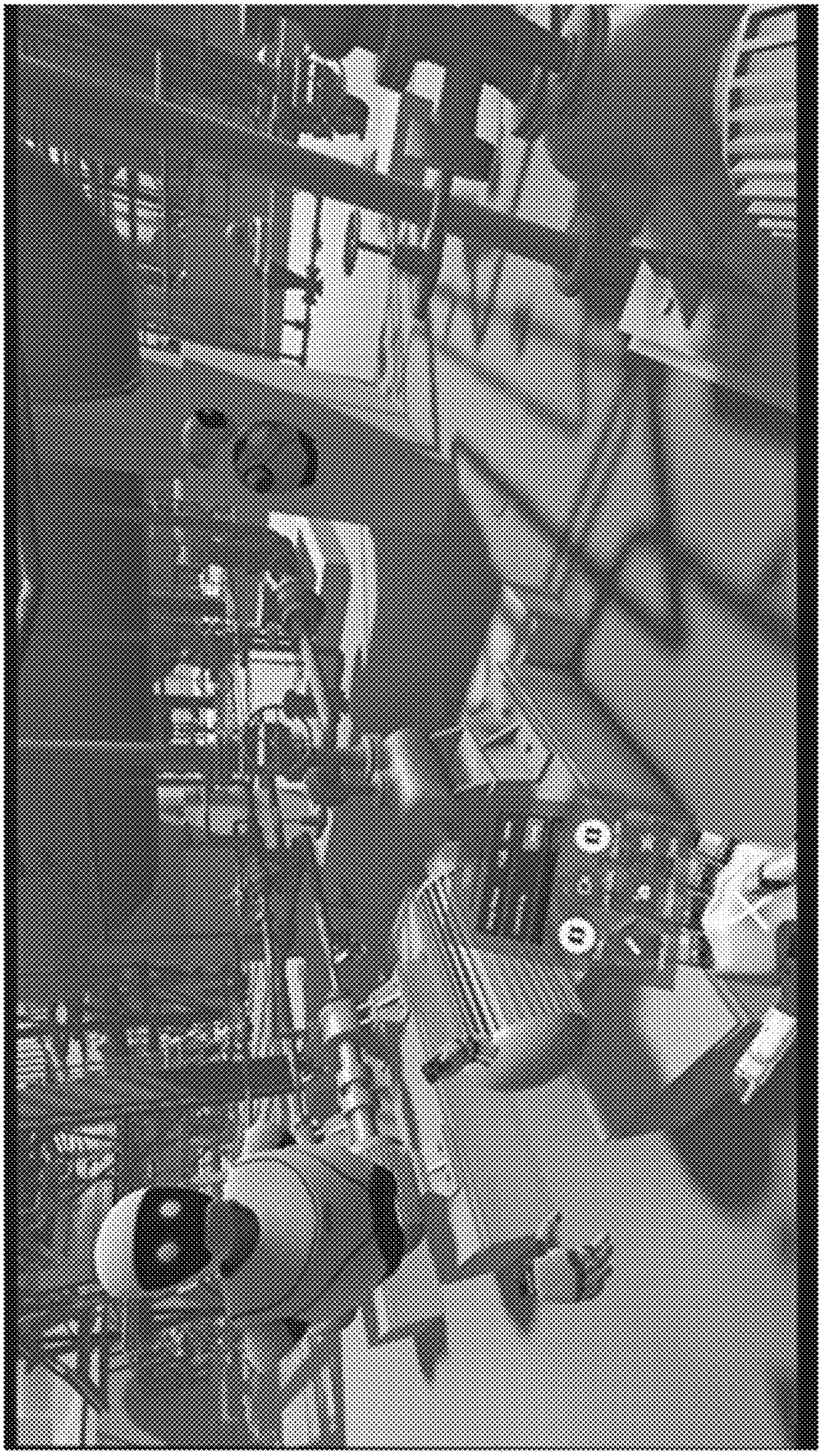
Figure 9K:
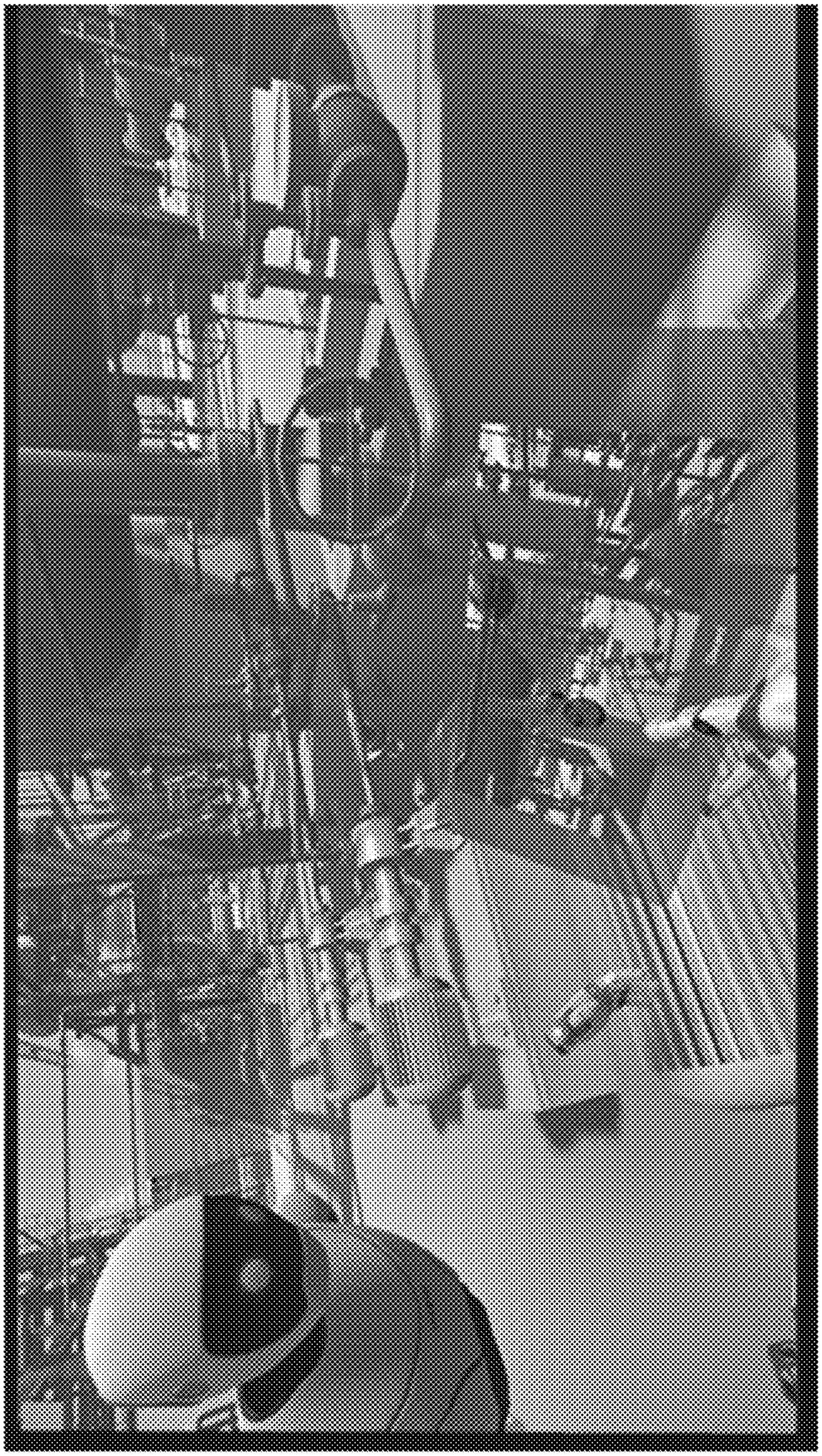

In FIG. 9G, in some embodiments, depicted is an example of a location (e.g., plant) being selected via VR functionality, whereby, as discussed herein, operations of the plant can be reviewed and analyzed. Accordingly, in some embodiments, other users (e.g., colleagues, for example) can be met with and/or interacted with in a virtual space to review asset information (e.g., 2D documents and/or review of 3D assets), as depicted in FIG. 9H. In some embodiments, as depicted in FIG. 9I, other types of meetings can be conducted within the virtual space associated with the plant—for example, a legacy meeting, Zoom® meeting, Microsoft Teams® meeting, and the like. In some embodiments, as depicted in FIG. 9J, a user and/or users can view a 1:1 rendering of the real-world environment of the virtual space associated with the location/asset, so that activities can be performed respective to the location/asset (e.g., measure, check values, review operations, and the like, as discussed herein). In some embodiments, as depicted in FIG. 9K, a snapshot and/or other form of interaction including, but not limited to, commenting, sharing information/documents, and the like, can be effectuated via the virtual space, which can occur in relation to depicted digital representations of assets, network locations and/or avatars of other users, and the like.

According to some embodiments, a user can download the XR application (associated with XR engine 200, as discussed above) from a network resource (e.g., an app store, for example), and install the application on their device (e.g., UE 102, for example). In some embodiments, upon signing up for and/or logging into services provided via an enterprise/industrial platform, hosted applications and files can be securely made available for usage by the user/device. Upon the user creating a metaverse 300 project and/or product, example 800 files structures can be created in cloud 106 (e.g., FIGS. 1 and 4-7, for example) so as to enable the local and/or remote access to the created files, renderings and simulations.

Turning to FIG. 10, by way of a non-limiting example, Process 1000 provides example embodiments for a workflow of a user creating metaverse 300 files for purposes of a metaverse 300 project and/or product, as discussed above and realizable via the configurations provided via FIGS. 4-9K, inter alia.

In some embodiments, an application associated with capabilities provided via XR engine 200 is identified and downloaded to a device, as in Step 1002. In Step 1004, upon opening the application, as UI is presented which enables a login to a cloud-based industrial enterprise service. In Step 1006, authorization can be provided, whereby in Step 1008, login credentials are validated for presentation of the available services for the subscription/access of the user.

In Step 1010, a welcome screen(s) can provide the user with available products. In some embodiments, as discussed above in relation to at least FIGS. 3-9K, can be related to tool, files, applications and/or data enabled via engine 200. In some embodiments, Step 1010 can enable the presentation of the information the user can access from cloud system 106 and/or database 108.

In some embodiments, upon a user selecting a specific file (e.g., PAK), if the selected PAK is not located on the user's device and/or in their web-hosted account work-space, as detected in Step 1012, and/or is an "old version" (e.g., a collaborator has updated the design since the user last accessed their saved version), as in Step 1014, Step 1016 can be executed to make the PAK resident and current on the user's device (and/or workspace). In some embodiments, if the PAK is determined resident (Step 1012) and/or current (Step 1014), such steps can be bypassed.

As a result of Step 1016, Step 1018 can be performed whereby the UI for the user experience (UX) can be generated and displayed on the user's device. For example, Step 1018 can enable the display of data related to a Collaboration Room 304, discussed supra. In another example, Step 1018 can enable the display of an Immersive Room 306, as discussed supra. For example, Step 1018 can enable the display of UI 1300, as depicted in FIG. 13, discussed supra. Thus, for example, in some embodiments, Step 1018 can correspond to the initiation of a joint collaboration session among users within UI 1200, and/or the user joining an existing collaboration session via UI 1300.

In some embodiments, in order to provide advanced security for collaboration/immersive sessions, engine 200 (and/or cloud system 106) may require a user to re-login after a predetermined period of time from a previous login (e.g., every 8 hours, for example). This can ensure the integrity of the users' identity of those actually working on the collaboration.

Turning to FIG. 14, Process 1400 provides non-limiting example embodiments for the disclosed industrial metaverse framework. According to some embodiments, Step 1402 of Process 1400 can be performed by request module 202 of XR engine 200; Steps 1404 and 1408 can be performed by analysis module 204; Steps 1406 and 1410 can be performed by determination module 206; and Steps 1412 and 1414 can be performed by output module 208.

According to some embodiments, the steps of Process 1400 can be effectuated, hosted and/or executed via the modules, VMs, engines, sources, clients and storage components and facilities discussed in relation to at least FIGS. 4-9K, supra, as evident from the discussion below.

According to some embodiments, Process 1400 begins with Step 1402 where engine 200 identifies endpoint information related to an endpoint (e.g., a space or location, such as, for example, a plant) and an associated set of assets (e.g., machinery at the plant). In some embodiments, Step 1402 can be triggered via request from at least one user. In some embodiments, the request can correspond to at least a portion of the steps of Process 1000 discussed above (e.g., a user creating an account and/or accessing structure for a project/product), for example.

According to some embodiments, Step 1402 can involve, as discussed above, identifying the parameters, characteristics, measurements, features and/or attributes of the endpoint and the assets associated therewith. Such analysis can be performed via any type of known or to be known mechanism for virtualizing a real-world item via an AR, VR, MR and/or XR space, as discussed above. In some embodiments, such data can be provided via the data hosted and/or created via the Collaboration Room 304, as discussed above (e.g., engineering data), for example. In some embodiments, engine 200 can execute a metaverse template or module which can effectuate the identification of the specifications of the endpoint information.

In Step 1404, the endpoint information can be analyzed, and in Step 1406, data can be determined that relates to the endpoint and/or assets. In some embodiments, the determined data can correspond to the virtualization of the real-world aspects of the endpoint/assets. In some embodiments, the analysis and determination can be performed in a similar manner as discussed above at least in relation to Step 1402.

In some embodiments, the analysis and determination of Steps 1402-1404 can be performed via engine 200 executing and/or implementing any type of known or to be known computational analysis technique, algorithm, mechanism or technology, which can include, but is not limited to, a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), etc.), or any other suitable definition of a machine learning model or any suitable combination thereof.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like.

In some embodiments and, optionally, in combination of any embodiment described above or below, a neutral network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
b. transfer the input data to the neural network model,
c. train the model incrementally,
d. determine the accuracy for a specific number of timesteps,
e. apply the trained model to process the newly-received input data,
f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Continuing with Process 1400, in Step 1408, at least one metaverse template is identified and applied to the determined data (from Step 1406). A metaverse template can be identified based on, but not limited to, a type of space, type of requested metaverse, type of asset, type of customer/user, attributes of the space, type and/or quantity of collaborators, and the like, or some combination thereof.

As a result, Step 1408 can further involve applying the metaverse template(s) to the determined data, whereby in Step 1410, engine 200 can determine a metaverse representation of the endpoint associated assets. In Step 1412, the determined metaverse representation can be rendered (e.g., output for display on a UI). In some embodiments, the representation can further involve access to applications which can be used during an immersive collaboration.

For example, determination metaverse representation of Step 1410 that is rendered via Step 1412 can be the depictions in FIGS. 12 and 13. In Step 1414, the information related to the rendering, which can be data/metadata related to the processing from any of the preceding steps, can be stored in storage. For example, such storage be in the cloud, and structured according to the depicted example structure in FIG. 8, discussed supra.

FIG. 17 is a schematic diagram illustrating a client device showing an example embodiment of a client device that may be used within the present disclosure. Client device 1700 may include many more or less components than those shown in FIG. 17. However, the components shown are sufficient to disclose an illustrative embodiment for implementing the present disclosure. Client device 1700 may represent, for example, UE 102 discussed above at least in relation to FIG. 1.

As shown in the figure, in some embodiments, Client device 1700 includes a processing unit (CPU) 1722 in communication with a mass memory 1730 via a bus 1724. Client device 1700 also includes a power supply 1726, one or more network interfaces 1750, an audio interface 1752, a display 1754, a keypad 1756, an illuminator 1758, an input/output interface 1760, a haptic interface 1762, an optional global positioning systems (GPS) receiver 1764 and a camera(s) or other optical, thermal or electromagnetic sensors 1766. Device 1700 can include one camera/sensor 1766, or a plurality of cameras/sensors 1766, as understood by those of skill in the art. Power supply 1726 provides power to Client device 1700.

Client device 1700 may optionally communicate with a base station (not shown), or directly with another computing device. In some embodiments, network interface 1750 is sometimes known as a transceiver, transceiving device, or network interface card (NIC).

Audio interface 1752 is arranged to produce and receive audio signals such as the sound of a human voice in some embodiments. Display 1754 may be a liquid crystal display (LCD), gas plasma, light emitting diode (LED), or any other type of display used with a computing device. Display 1754 may also include a touch sensitive screen arranged to receive input from an object such as a stylus or a digit from a human hand.

Keypad 1756 may include any input device arranged to receive input from a user. Illuminator 1758 may provide a status indication and/or provide light.

Client device 1700 also includes input/output interface 1760 for communicating with external. Input/output interface 1760 can utilize one or more communication technologies, such as USB, infrared, Bluetooth™, or the like in some embodiments. Haptic interface 1762 is arranged to provide tactile feedback to a user of the client device.

Optional GPS transceiver 1764 can determine the physical coordinates of Client device 1700 on the surface of the Earth, which typically outputs a location as latitude and longitude values.

GPS transceiver 1764 can also employ other geo-positioning mechanisms, including, but not limited to, triangulation, assisted GPS (AGPS), E-OTD, CI, SAI, ETA, BSS or the like, to further determine the physical location of client device 1700 on the surface of the Earth. In one embodiment, however, Client device may through other components, provide other information that may be employed to determine a physical location of the device, including for example, a MAC address, Internet Protocol (IP) address, or the like.

Mass memory 1730 includes a RAM 1732, a ROM 1734, and other storage means. Mass memory 1730 illustrates another example of computer storage media for storage of information such as computer readable instructions, data structures, program modules or other data. Mass memory 1730 stores a basic input/output system ("BIOS") 1740 for controlling low-level operation of Client device 1700. The mass memory also stores an operating system 1741 for controlling the operation of Client device 1700.

Memory 1730 further includes one or more data stores, which can be utilized by Client device 1700 to store, among other things, applications 1742 and/or other information or data. For example, data stores may be employed to store information that describes various capabilities of Client device 1700. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 1700.

Applications 1742 may include computer executable instructions which, when executed by Client device 1700, transmit, receive, and/or otherwise process audio, video, images, and enable telecommunication with a server and/or another user of another client device. Applications 1742 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, some embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While some embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A system for modifying three-dimensional (3D) models comprising:

one or more computers comprising one or more processors and one or more non-transitory computer readable media, the one or more non-transitory computer readable media comprising program instructions thereon that when executed cause the one or more computers to:

generate, by the one or more processors, a development environment configured to enable a user to create a 3D virtual representation of a physical environment;

link, by the one or more processors, the development environment to one or more external modules;

import, by the one or more processors, source data from the one or more external modules into the development environment;

generate, by the one or more processors, one or more virtual models that include the source data in the development environment;

execute, by the one or more processors within the development environment that is separate from a runtime environment of any client computer, a manipulation of the one or more virtual models in the development environment, the one or more virtual models comprising federated 3D models and the imported source data from the one or more external modules, the manipulation causing a change to at least one characteristic of the imported source data associated with the one or more virtual models;

receive, by the one or more processors, instructions to execute the change to the at least one characteristic of the imported source data, the execution simultaneously causing: i) the changes to the at least one characteristic of the imported source data being automatically propagated to the runtime environment, the propagation causing the runtime environment to display the one or more virtual models with the changes and ii) the change to the at least one characteristic to be stored in the one or more external modules, the one or more external modules being stored separately from the development environment.

2. The system of claim 1, wherein the change is stored in a same module from which the source data was imported.

3. The system of claim 2, wherein the change is stored in the same module from which the source data was imported without having to export the one or more virtual models from a runtime environment.

4. The system of claim 1, further comprising a plurality of client computers; wherein each of the plurality of client computers are able to access the development environment simultaneously.

5. The system of claim 4, wherein the system is configured to enable each of the plurality of client computers to make changes to the one or more virtual models.

6. The system of claim 5, wherein the changes occur in the one or more virtual models as the changes are implemented in the development environment.

7. The system of claim 1, further including a plurality of client computers and a connection platform;

wherein the connection platform is configured to enable the plurality of client computers to access the development environment.

8. The system of claim 7, wherein the development environment is not executing in a runtime of any of the plurality of client computers.

9. The system of claim 8, wherein changes in the development environment are automatically propagated to one or more modules stored separately from both the plurality of client computers and the development environment.

10. The system of claim 9, wherein the changes are automatically propagated as they occur.

11. The system of claim 1, wherein the one or more external modules include one or more of a metaverse template module, an asset template module, a storage database, a customer upload module, and an external data source module.

12. The system of claim 3, wherein the one or more external modules include one or more of a metaverse template module, an asset template module, a storage database, a customer upload module, and an external data source module.

13. The system of claim 1, wherein the one or more external modules includes a change management module configured for maintaining changes to virtual modules.

14. The system of claim 13, wherein the change management module is configured to store a record of the changes in a respective external module from which the source data originated.

15. The system of claim 14, wherein the changes are stored in the respective external module as the changes are implemented in the development environment.

* * * * *